(12) United States Patent
Okuno et al.

(10) Patent No.: US 6,617,898 B2
(45) Date of Patent: Sep. 9, 2003

(54) VOLTAGE CONVERSION CIRCUIT AND SEMICONDUCTOR INTEGRATED CIRCUIT DEVICE PROVIDED THEREWITH

(75) Inventors: Tomohisa Okuno, Tenri (JP); Yuichi Sato, Mie (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/987,157

(22) Filed: Nov. 13, 2001

(65) Prior Publication Data

US 2002/0084809 A1 Jul. 4, 2002

(30) Foreign Application Priority Data

Nov. 13, 2000 (JP) .......................................... 2000-344809

(51) Int. Cl.[7] ............................................... H03K 3/017
(52) U.S. Cl. ........................... 327/172; 327/175; 327/35
(58) Field of Search ................................. 327/172–176, 327/263, 264, 269, 270, 271, 276, 277, 284, 164–166, 31, 33, 35

(56) References Cited

U.S. PATENT DOCUMENTS

| 4,691,330 A | * | 9/1987 | Takahashi et al. ............. 377/39 |
| 4,848,923 A | * | 7/1989 | Ziegler et al. ................. 331/66 |
| 5,278,456 A | * | 1/1994 | Bechade et al. ............. 327/172 |
| 5,910,742 A | * | 6/1999 | Synder et al. ............... 327/165 |
| 6,049,255 A | * | 4/2000 | Hagberg et al. .............. 331/17 |
| 6,140,848 A | * | 10/2000 | Harvey ....................... 327/112 |
| 6,166,562 A | | 12/2000 | Mita et al. ..................... 326/83 |
| 6,229,364 B1 | * | 5/2001 | Dortu et al. ................. 327/158 |

FOREIGN PATENT DOCUMENTS

JP          10-242831          9/1998

* cited by examiner

Primary Examiner—Timothy P. Callahan
Assistant Examiner—An T. Luu
(74) Attorney, Agent, or Firm—Birch, Stewart, Kolasch & Birch, LLP

(57) ABSTRACT

A voltage conversion circuit has a pulse generator that generates a pulse signal having a fixed pulse width and a variable pulse period. The output voltage of this voltage conversion circuit is determined according to the ratio of the pulse width to the pulse period of the pulse signal generated by the pulse generator. This circuit configuration makes it possible to produce as the output voltage lower voltages than ever.

10 Claims, 20 Drawing Sheets

FIG. 15

| LA | LB | STATUS |
|----|----|--------|
| L  | L  | NG     |
| L  | H  | WARN   |
| H  | L  | FAST   |
| H  | H  | OK     |

FIG. 17

| LA | LB | S0 | S5 | VOLTAGE CONTROL SIGNAL |
|---|---|---|---|---|
| L | L | L | - | UP |
| L | L | H | - | STAY |
| L | H | L | - | UP |
| L | H | H | - | STAY |
| H | L | - | L | DOWN |
| H | L | - | H | STAY |
| H | H | - | - | STAY |

| UP | STAY | DOWN | CF2 | CF1 | CF0 |
|----|------|------|-----|-----|-----|
| 1  | 0    | 0    | 0   | 0   | 1   |
| 0  | 1    | 0    | 0   | 0   | 0   |
| 0  | 0    | 1    | 1   | 1   | 1   |

VOLTAGE CONVERSION CIRCUIT AND SEMICONDUCTOR INTEGRATED CIRCUIT DEVICE PROVIDED THEREWITH

BACKGROUND OF THE INVENTION

1. Field of the Invention

The present invention relates to a voltage conversion circuit for supplying a driving voltage to an integrated circuit, and relates also to a semiconductor integrated circuit device provided with such a voltage conversion circuit.

2. Description of the Prior Art

In general, an integrated circuit that performs arithmetic or other operation in synchronism with an operation clock is designed with ample margins in its specifications to ensure that it operates normally even when there are variations in its characteristics that are inevitable in its manufacturing process or fluctuations in the supplied voltage or in the ambient temperature. Specifically, an integrated circuit is so designed that, even when the delay it produces increases as a result of a variation or fluctuation such as mentioned above or any other factor, an operation of the integrated circuit as a whole is complete within one clock of the operation clock. Moreover, a sufficiently high supply voltage is supplied to the integrated circuit so that it operates normally even when all the factors mentioned above are in the worst condition.

Designing an integrated circuit with ample margins in its specifications and applying a sufficiently high supply voltage to it as described above, however, make it difficult to enhance its speed and to reduce its power consumption. For this reason, efforts have been made to develop a voltage conversion circuit that controls a supply voltage according to the operation status of an integrated circuit so that the integrated circuit is fed with the minimum driving voltage it requires to operate at a given time.

FIG. 21 is a diagram schematically showing an example of the circuit configuration of a conventional voltage conversion circuit. The voltage conversion circuit shown in FIG. 21 is disclosed in Japanese Patent Application Laid-Open No. H10-242831, and is composed of a duty factor control circuit 901, a buffer circuit 902, a filter circuit 903, a critical path circuit 904, a delay circuit 905, a true/false evaluation circuit 906, and an adder 907.

The duty factor control circuit 901 is a circuit that controls the varying of an output voltage in the buffer circuit 902, and is composed of a counter and a comparator. The counter counts up from 0 to $2^{n-1}$ (for example, when n=6, from 0 to 63) in increments of 1 in synchronism with every period of a clock signal (not shown) fed to it, and feeds its count, in the form of an n-bit signal NA, to the comparator. The count that follows $2^{n-1}$ is 0. The comparator is fed with, in addition to the signal NA, another n-bit signal NB from the adder 907.

The comparator is a circuit that controls the on/off state of a PMOS transistor M1 and an NMOS transistor M2 that together constitute the buffer circuit 902. The comparator feeds control signals X1 and X2 to the gates of the transistors M1 and M2 respectively. When the signal NA equals 0, the comparator turns the voltage levels of the control signals X1 and X2 to a low level (hereinafter "L level"); when the signals NA and NB are equal, the comparator turns the voltage levels of the control signals X1 and X2 to a high level (hereinafter "H level").

In the buffer circuit 902, a first supply voltage is applied to the source of the PMOS transistor M1, and a second supply voltage (here the ground voltage) is applied to the source of the NMOS transistor M2. The two transistors have their drains connected together, with the node between them serving as the output end of the buffer circuit 902.

Accordingly, when the control signals X1 and X2 are at L level, the PMOS transistor M1 is on and the NMOS transistor M2 is off. Thus, the output voltage of the buffer circuit 902 is nearly equal to the first supply voltage. By contrast, when the control signals X1 and X2 are at H level, the PMOS transistor M1 is off and the NMOS transistor M2 is on. Thus, the output voltage of the buffer circuit 902 is nearly equal to the second supply voltage (i.e. the ground voltage). That is, the output voltage of the buffer circuit 902 is a pulsating voltage signal Y that rises when the signal NA turns to 0 and that falls when the signal NA becomes equal to the signal NB.

This voltage signal Y is smoothed by the filter circuit 903 composed of an inductor L1 and a capacitor C1, and is thereby formed into an output voltage Z. The output voltage Z is supplied to an internal circuit (not shown) formed on the same circuit board so as to be used as the driving voltage for the internal circuit. The output voltage Z is used also as the supply voltage for the critical path circuit 904.

In the buffer circuit 902, let the period in which the PMOS transistor M1 is on and the NMOS transistor M2 is off (i.e. the period in which the control signals X1 and X2 are at L level) be called the on period T1, and let the period in which the PMOS transistor M1 is off and the NMOS transistor M2 is on (i.e. the period in which the control signals X1 and X2 are at H level) be called the off period T2. Then, the output voltage Z of the filter circuit 903 is generally given by $$Z = \frac{T1}{T1+T2} \times VDD \quad (1)$$

In the formula above, the on period T1 (the numerator in the right side) represents the pulse width of the voltage signal Y, and the sum T1+T2 of the on period T1 and the off period T2 (the denominator in the right side) represents the pulse period of the voltage signal Y. That is, the output voltage Z can be controlled by controlling the ratio of the pulse width to the pulse period of the voltage signal Y (hereinafter this ratio will be referred to as the "duty factor").

In the voltage conversion circuit configured as described above, the value of the signal NB fed from the adder 907 to the comparator of the duty factor control circuit 901 is varied to vary the on period T1 (the pulse width) and thereby control the duty factor of the voltage signal Y output from the buffer circuit 902. In this way, it is possible to control the driving voltage (the output voltage Z) fed to the internal circuit. (In the following descriptions, this method of controlling the duty factor is called the variable pulse width method.) Moreover, as a means for setting the signal NB at the optimum value at a given time, the operation speed of the critical path circuit 904 is detected.

The critical path circuit 904 is a duplicate circuit of the path that is considered to produce the longest delay within the internal circuit to which the output voltage Z is fed. As described earlier, the output voltage Z of the filter circuit 903 is applied to the critical path circuit 904 as the supply voltage for it. That is, the driving voltage for the internal circuit, i.e. the destination of the voltage supply, is monitored by the critical path circuit 904. Here, it is assumed that the range of voltages on which the critical path circuit 904 can operate is equal to that on which the internal circuit can operate.

When the critical path circuit 904 can operate on the output voltage Z of the filter circuit 903, the critical path circuit 904 feeds predetermined data to the true/false evaluation circuit 906. Here, the true/false evaluation circuit 906 receives the data not only directly from the critical path circuit 904, but also with a delay through the delay circuit 905.

If the true/false evaluation circuit 906 does not receive the data directly from the critical path circuit 904, the true/false evaluation circuit 906 judges that the internal circuit, i.e. the destination of the voltage supply, is not operating normally, and therefore judges that the driving voltage for the internal circuit (i.e. the output voltage Z of the filter circuit 903) is too low. Thus, the true/false evaluation circuit 906 feeds the adder 907 with a signal S1 that instructs it to increment the value of the signal NB by 1 to increase the driving voltage.

If the true/false evaluation circuit 906 receives the delayed data through the delay circuit 905, the true/false evaluation circuit 906 judges that the internal circuit, i.e. the destination of the voltage supply, is operating normally despite the delay given to it, and therefore judges that the driving voltage for the internal circuit is too high. Thus, the true/false evaluation circuit 906 feeds the adder 907 with a signal S2 that instructs it to decrement the value of the signal NB by 1 to decrease the driving voltage.

If the true/false evaluation circuit 906 receives the data directly from the critical path circuit 904 but does not receive the delayed data through the delay circuit 905, the true/false evaluation circuit 906 judges that the internal circuit, i.e. the destination of the voltage supply, is receiving the optimum driving voltage at the time. Thus, the true/false evaluation circuit 906 feeds the adder 907 with neither the signal S1 nor the signal S2.

When the true/false evaluation circuit 906 outputs the signal S1, the adder 907 feeds the duty factor control circuit 901 with a value obtained by adding 1 to the current value of the signal NB. By contrast, when the true/false evaluation circuit 906 outputs the signal S2, the adder 907 feeds the duty factor control circuit 901 with a value obtained by adding −1 to the current value of the signal NB.

In this way, in the voltage conversion circuit configured as described above, the critical path circuit 904, the delay circuit 905, and the true/false evaluation circuit 906 detect the operation speed of the internal circuit, i.e. the destination of the voltage supply, and control the duty factor of the voltage signal Y in such a way as to decrease the driving voltage for the internal circuit (i.e. the output voltage Z) if the detected operation speed is too fast and increase the driving voltage for the internal circuit (i.e. the output voltage Z) if the detected operation speed is too slow.

It is true that the voltage conversion circuit configured as described above contributes to the reduction of the power consumption of the integrated circuit, because it permits the internal circuit constituting the integrated circuit to be fed with the minimum driving voltage on which the internal circuit can operate at a given time according to the operation status of the internal circuit. It is also true that this voltage conversion circuit is useful as a voltage step-down circuit for common integrated circuits, because it permits the output voltage Z to be varied in a wide range.

Incidentally, a very effective way to further reduce the power consumption of the internal circuit is to reduce the supply voltage for the devices themselves that constitute the internal circuit. For example, the power consumption of an internal circuit employing devices that operate on a supply voltage of 0.5 V is $\frac{1}{36}$ of the power consumption of an internal circuit employing devices that operate on a supply voltage of 3 V. In this way, by reducing the supply voltage for and the load current through the internal circuit, it is possible to further reduce power consumption.

As the power consumption of the internal circuit decreases, the proportion of the power consumption of the voltage conversion circuit to that of the integrated circuit as a whole increases relatively. Therefore, to further reduce the power consumption of the integrated circuit as a whole, it is essential to reduce the power consumption of the voltage conversion circuit itself.

Here, one possible means of reducing the power consumption of the voltage conversion circuit itself configured as described above is restricting the range in which the output voltage Z can be varied, because this helps simplify the control required and reduce the scale of the duty factor control circuit 901, the adder 907, and other circuit blocks.

For example, in a case where the voltage conversion circuit receives an external source voltage of about 3 V and supplies power to an internal circuit that operates on 0.5 V, the voltage that the voltage conversion circuit outputs to the internal circuit need not be so high as to be close to the voltage that the voltage conversion circuit receives. Moreover, the devices constituting the internal circuit have their respective optimum operating voltages, and therefore it is still possible to cope with variations inevitable in their manufacturing process and changes in the operating environment even if the range in which the output voltage Z can be varied is restricted, as long as it is restricted in the vicinity of the operating voltages of those devices. In this way, by restricting the range in which the output voltage Z can be varied, it is possible to reduce the circuit scale of the voltage conversion circuit and thereby reduce its power consumption.

However, in the voltage conversion circuit adopting the variable pulse width method, in which the value of the signal NB fed from the adder 907 to the comparator is varied to vary the on period T1 (the pulse width) and thereby control the duty factor of the output signal Y output from the buffer circuit 902, even when the range in which the output voltage Z can be varied is restricted, it is still necessary to provide a counter circuit that operates at high speed.

For example, in the conventional voltage conversion circuit configured as described above, the counter circuit operates at $2^n$ times (i.e., when n=6, 64 times) the frequency of the voltage signal Y. The counter circuit, operating at such high speed, thus increases the power consumption of the voltage conversion circuit itself, but, to permit the output voltage Z to be varied with high accuracy, it is inevitable to keep the operation speed of the counter circuit sufficiently high.

For this reason, in the conventional voltage conversion circuit adopting the variable pulse width method, even when the range in which the output voltage Z can be varied is restricted for an internal circuit that can operate on a low voltage, the operation speed of the counter circuit needs to be kept sufficiently high. This makes it impossible to achieve satisfactory reduction of the power consumption of the voltage conversion circuit itself.

SUMMARY OF THE INVENTION

An object of the present invention is to provide a voltage conversion circuit suitable for lower output voltage applications, and to provide a semiconductor integrated circuit device provided with such a voltage conversion circuit.

To achieve the above object, according to the present invention, a voltage conversion circuit is provided with a pulse generator for generating a pulse signal having a fixed pulse width and a variable pulse period. Here, the output voltage is determined according to the ratio of the pulse width to the pulse period of the pulse signal generated by the pulse generator.

BRIEF DESCRIPTION OF THE DRAWINGS

This and other objects and features of the present invention will become clear from the following description, taken in conjunction with the preferred embodiments with reference to the accompanying drawings in which:

FIG. 15 is a table showing the relationship between the operation status signals LA and LB observed in the replica circuit 501 and the operation status of the internal circuit;

FIG. 17 is a truth table of the logic circuit provided in the voltage control signal generator 601;

DESCRIPTION OF THE PREFERRED EMBODIMENTS

Figure 1:
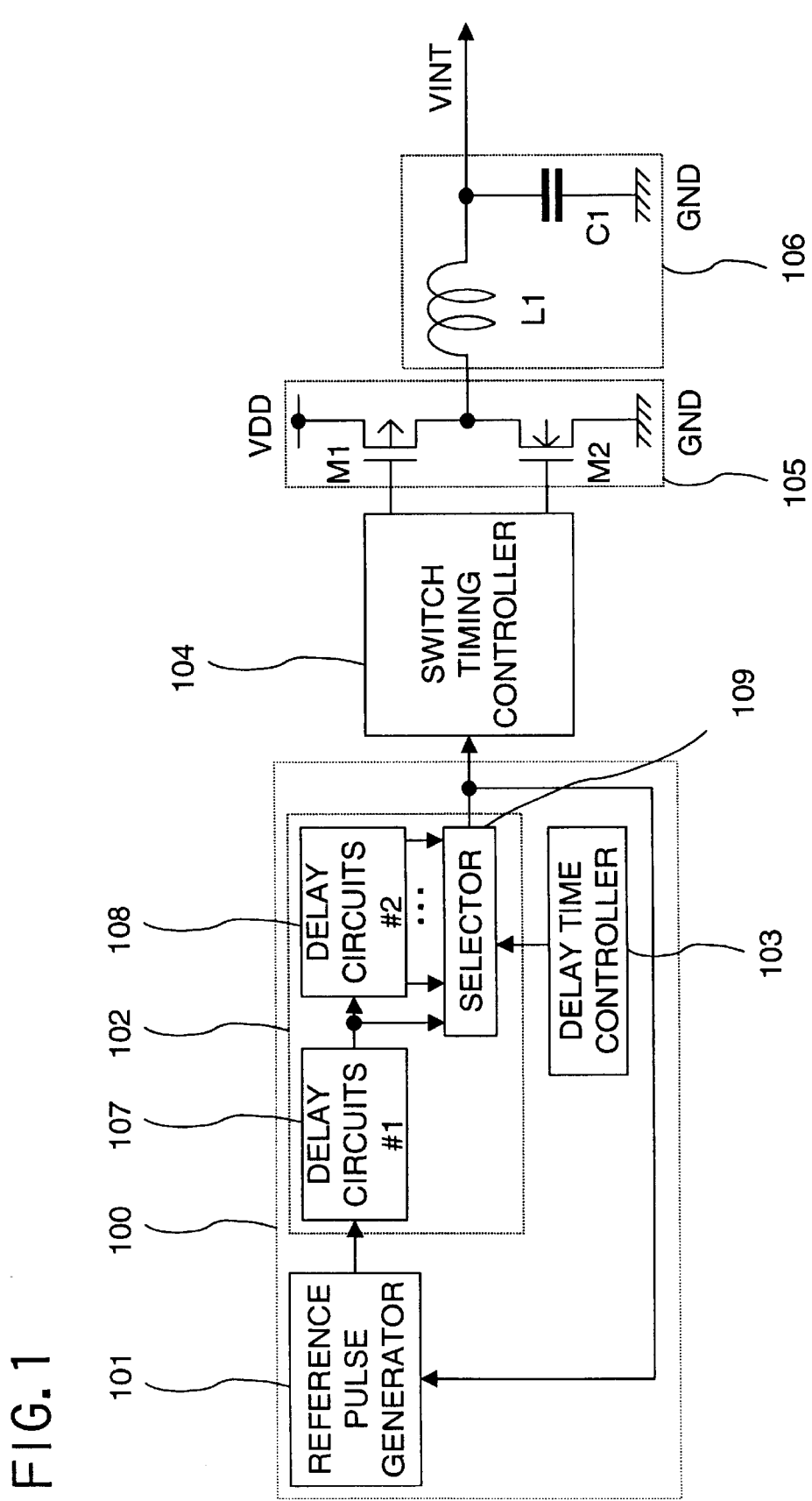
FIG. 1 is a diagram schematically showing the circuit configuration of the voltage conversion circuit of a first embodiment of the invention.

Hereinafter, as examples of voltage conversion circuits according to the present invention, voltage conversion circuits (voltage step-down circuits) that supply a driving voltage to the internal circuit constituting a semiconductor integrated circuit device will be described. FIG. 1 is a diagram schematically showing the circuit configuration of the voltage conversion circuit of a first embodiment of the invention. The voltage conversion circuit shown in this figure is composed of an output pulse generator 100, a switch timing controller 104, a switch circuit 105, and a filter circuit 106.

The output pulse generator 100 is a circuit that generates an output pulse signal DOUT having a fixed pulse width and a variable pulse period and that then feeds this output pulse signal DOUT to the switch timing controller 104. The circuit configuration and the operation of the output pulse generator 100 will be described in detail later.

The switch timing controller 104 is a circuit that produces from the output pulse signal DOUT fed to it a first and a second control signal $\phi1$ and $\phi2$ and that feeds these first and second control signals $\phi1$ and $\phi2$ respectively to the gates of a PMOS transistor M1 and an NMOS transistor M2 that together constitute the switch circuit 105. That is, the switch timing controller 104 controls the on/off states of the PMOS transistor M1 and the NMOS transistor M2. The circuit configuration and the operation of the switch timing controller 104 will also be described in detail later.

In the switch circuit 105, a first supply voltage (an external source voltage VDD) is applied to the source of the PMOS transistor M1, and a second supply voltage (a ground voltage GND) is applied to the source of the NMOS transistor M2. The two transistors have their drains connected together, and the node between them serves as the output end of the switch circuit 105. Thus, as the on/off states of the PMOS transistor M1 and the NMOS transistor M2 are controlled, the switch circuit 105 outputs a pulsating voltage signal at its output end.

The filter circuit 106 is a low-pass filter composed of an inductor L1 and a capacitor C1. One end of the inductor L1 is connected to the output end of the switch circuit 105, and the other end is connected through the capacitor C1 to ground. The node between the inductor L1 and the capacitor C1 serves as the output end of the filter circuit 106, and is connected to an internal circuit (not shown) and the like formed on the same circuit board.

The pulsating voltage signal output from the switch circuit 105 is smoothed by the filter circuit 106 and is thereby formed into an output voltage VINT. This output voltage VINT is supplied to the internal circuit (not shown) so as to be used as the driving voltage for the internal circuit. FIG. 1 shows an example in which the filter circuit 106 is built as an LC circuit; however, it may be built as an RC circuit, or a circuit of any other configuration.

Here, the magnitude of the output voltage VINT can be controlled by varying the duty factor (the ratio of the pulse width to the pulse period) of the pulsating voltage signal output from the switch circuit 105, i.e. by varying the duty factors of the first and second control signals $\phi1$ and $\phi2$.

In the voltage conversion circuit of this embodiment, the output pulse generator 100 generates an output pulse signal DOUT having a fixed pulse width and a variable pulse period, and, by varying the pulse period of this output pulse signal DOUT appropriately, the duty factors of the first and second control signals φ1 and φ2 are controlled. This makes it possible to control the driving voltage (the output voltage VINT) supplied to the internal circuit. (In the following descriptions, a method of controlling a duty factor like this will be called the variable pulse period method.)

Next, the circuit configuration and the operation of the output pulse generator 100 mentioned above will be described in detail. As FIG. 1 shows, the output pulse generator 100 is composed of a reference pulse generator 101, a delay circuit 102, and a delay time controller 103.

The reference pulse generator 101 is a circuit that generates a reference pulse signal having a fixed pulse width and that feeds it to the delay circuit 102. The delay circuit 102 is a circuit that produces a delayed pulse signal delayed by a predetermined time relative to the reference pulse signal, and is composed of delay circuits #1 (or fixed delay circuits) 107, delay circuits #2 (or multi-delay circuits) 108, and a selector 109. The delay time controller 103 is a circuit that feeds a select signal to the selector 109 and thereby sets the delay produced by the delay circuit 102 so that the desired output voltage VINT is obtained. The circuit configuration and the operation of the delay time controller 103 will be described in detail later.

Figure 2:
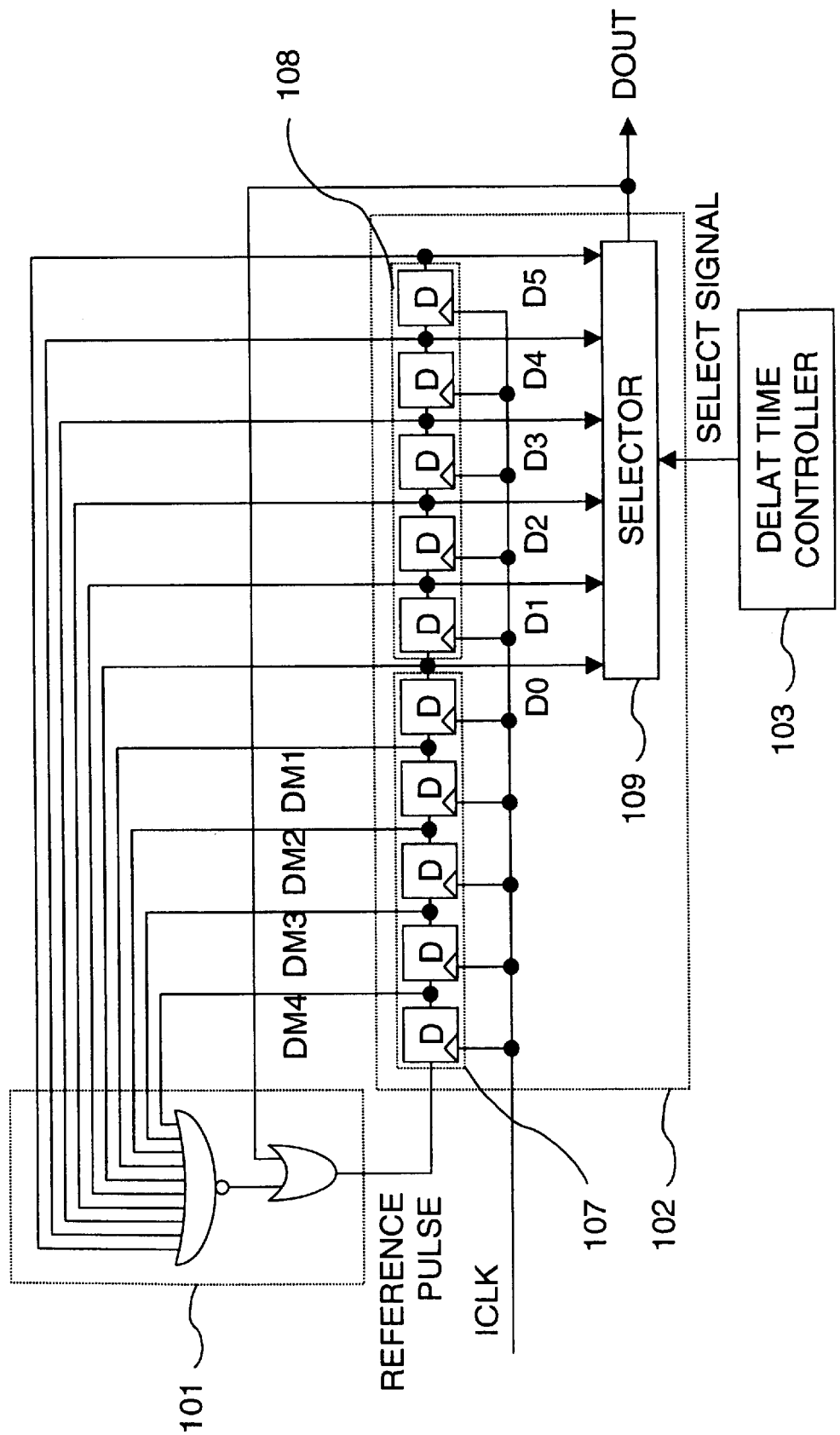
FIG. 2 is a diagram schematically showing an example of the circuit configuration of the reference pulse generator 101 and the delay circuits 102.

FIG. 2 is a diagram schematically showing an example of the circuit configuration of the reference pulse generator 101 and the delay circuit 102. First, the circuit configuration of the delay circuit 102 will be described. In the delay circuit 102, the delay circuits #1 107 as a whole act as a circuit that gives a delay of N times a predetermined unit time to the reference pulse signal fed from the reference pulse generator 101. The delay circuits #2 108 as a whole act as a circuit that gives a delay of M times the predetermined unit time to the final output signal D0 of the delay circuits #1 107.

FIG. 2 shows an example in which the delay circuits #1 107 and the delay circuits #2 108 employ, as unit time delay elements, D flip-flop circuits that are triggered by positive (rising) edges of an internal clock signal ICLK, and the following description assumes this circuit configuration. However, as the unit time delay elements may be used flip-flop circuits or delay elements of any other type than D flip-flop circuits.

The delay circuits #1 107 are built as a shift register (of which the number of delay stages is N=5) composed of five D flip-flop circuits connected in series. Thus, these flip-flop circuits output, at their respective output terminals, output signals DM4 to DM1 and D0 that are respectively given delays of 1 to 5 times a predetermined unit time relative to the reference pulse signal. Here, the number N of delay stages needs to be 1 or more.

The delay circuits #2 108 also are built as a shift register (of which the number of delay stages is M=5) composed of five D flip-flop circuits connected in series. Thus, these flip-flop circuits output, at their respective output terminals, output signals D1 to D5 that are respectively given delays of 1 to 5 times the predetermined unit time relative to the output signal D0. Here, the number M of delay stages needs to be 1 or more.

The flip-flop circuits constituting the delay circuits #1 107 and the delay circuits #2 108 all receive, at their clock terminals, the same internal clock signal ICLK. As this internal clock signal ICLK may be used a clock signal produced by any means, for example an external clock signal fed from outside the integrated circuit, a clock signal obtained through frequency division of such an external clock signal, or a clock signal generated by an oscillation circuit provided within the integrated circuit.

In this way, the delay circuit 102 can be formed easily by building the delay circuits #1 107 and the delay circuits #2 108 with flip-flop circuits.

The selector 109 is a circuit that selects as the delayed pulse signal one among the final output signal D0 of the delay circuits #1 107 and the outputs D1 to D5 of the delay circuits #2 108 according to the select signal fed from the delay time controller 103.

Figure 3:
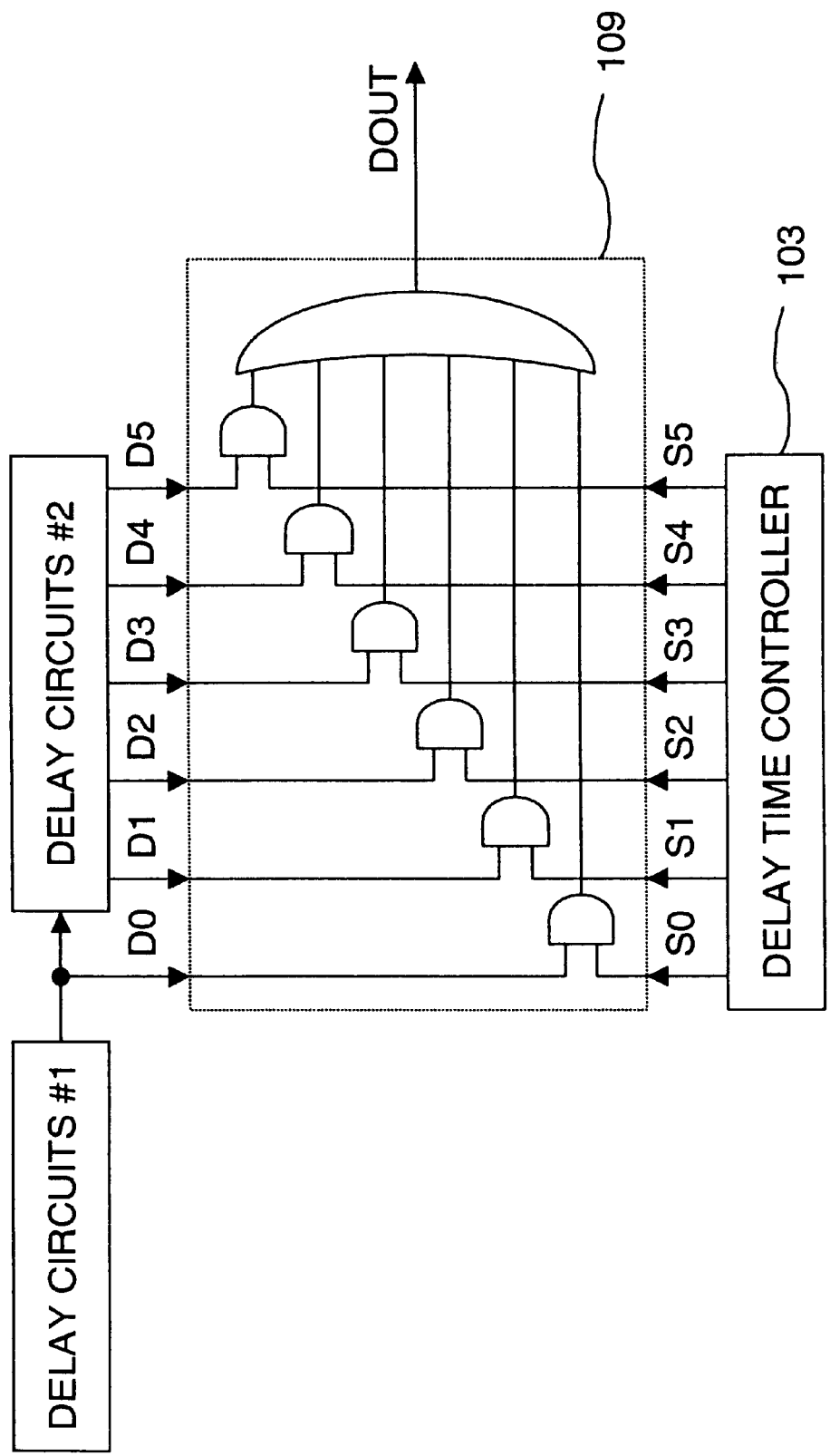
FIG. 3 is a diagram schematically showing an example of the circuit configuration of the selector 109.

FIG. 3 is a diagram schematically showing the circuit configuration of the selector 109. As this figure shows, the selector 109 is composed of six AND circuits each having two input terminals, and an OR circuit having multiple input terminals.

The AND circuits respectively receive, at one input terminal, the final output signal D0 of the delay circuits #1 107 and the outputs D1 to D5 of the delay circuits #2 108. The AND circuits respectively receive, at the other input terminal, select signals S0 to S5 fed from the delay time controller 103.

For example, to select the output signal D0 as the delayed pulse signal, the select signal S0 is turned to H level, with the other select signals S1 to S5 kept at L level. The select signals S0 to S5 are so controlled as not to change in periods in which a pulse signal is flowing through the delay circuits #2 108.

The OR circuit receives, at its input terminals, the output signals of the individual AND circuits, and outputs the logical sum (OR) of those signals as the delayed pulse signal selected by the selector 109. The delayed pulse signal is fed as the output pulse signal DOUT to the switch timing controller 104 and also to the reference pulse generator 101.

Next, the circuit configuration of the reference pulse generator 101 will be described, with reference back to FIG. 2. The reference pulse generator 101 is composed of a NOR circuit having multiple input terminals and an OR circuit having two impute terminals. The NOR circuit receives, at its input terminals, the output signals DM4 to DM1 and D0 to D5 output individually from the delay circuit 102. The NOR circuit has the function of producing the initial pulse of the reference pulse signal when the voltage conversion circuit has just been started up.

The OR circuit receives, at one input terminal, the output signal of the NOR circuit and, at the other input terminal, the delayed pulse signal selected by the selector 109. The output signal of the OR circuit is fed as the reference pulse signal to the delay circuit 102.

Next, the operation of the output pulse generator 100 configured as described above will be described. When the voltage conversion circuit is started up, the flip-flop circuits constituting the delay circuit 102 are first reset by a reset signal (not shown) so that their output signals DM4 to DM1 and D0 to D5 are all turned to L level. This causes the output signal of the NOR circuit, which is the inverted logical sum (NOR) of the output signals DM4 to DM1 and D0 to D5, to turn to H level.

As a result, the output signal of the OR circuit, which is the logical sum (OR) of the output signal of the NOR circuit and the delayed pulse signal output from the selector 109, also turns to H level. In this way, the initial pulse of the reference pulse signal fed to the delay circuit 102 is produced.

On the other hand, when the voltage conversion circuit is operating steadily, one of the output signals DM4 to DM1 and D0 to D5 fed to the multiple input terminals of the NOR circuit is at H level at a time, and therefore the NOR circuit always outputs L level. Thus, the OR circuit transfers the delayed pulse signal returning from the selector 109 intact as the reference pulse signal to the delay circuit 102.

Next, the delay operation of the delay circuit 102 will be described. FIGS. 4A to 4D are signal waveform diagrams showing an example of the delay operation preformed by the delay circuit 102, specifically an example of the output pulse signal DOUT output from the delay circuit 102. Here, it is assumed that the pulse width of the output pulse signal DOUT is equal to 1 unit time, and that the unit delay time produced by the individual flip-flop circuits constituting the delay circuit 102 is adapted to the pulse width so as to be equal to 1 unit time.

Figure 4A:
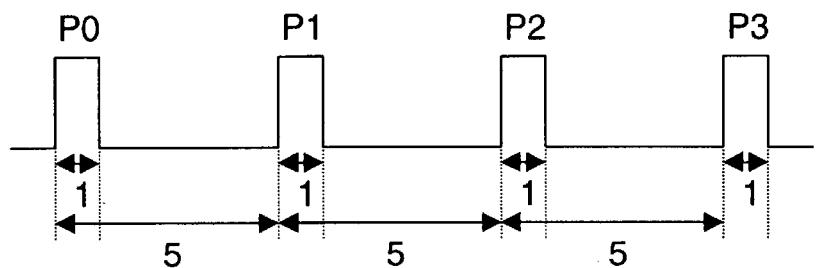
FIGS. 4A to 4D are signal waveform diagrams showing an example of the delay operation performed by the delay circuits 102.

FIG. 4A shows the signal waveform obtained when the output signal D0 of the delay circuits #1 107 is selected as the delayed pulse signal, i.e. as the output pulse signal DOUT. In this case, the initial pulse P0 of the reference pulse signal fed to the delay circuit 102 is given a delay of 5 unit times by the five flip-flop circuits constituting the delay circuits #1 107. Thus, in the output pulse signal DOUT appears a pulse P1 given a delay of 5 unit times relative to the initial pulse P0.

This pulse P1 is fed back to the reference pulse generator 101, and is fed again as the reference pulse signal to the delay circuit 102. Thereafter, in similar manner, the pulse fed to the delay circuit 102 is given a delay of 5 unit times so that pulses P2 and P3 are produced sequentially. Thus, the pulse period of the output pulse signal DOUT equals 5 unit times. Here, since the pulse width of each pulse in the output pulse signal DOUT equals 1 unit time, the duty factor of the output pulse signal DOUT equals ⅕.

Figure 4B:
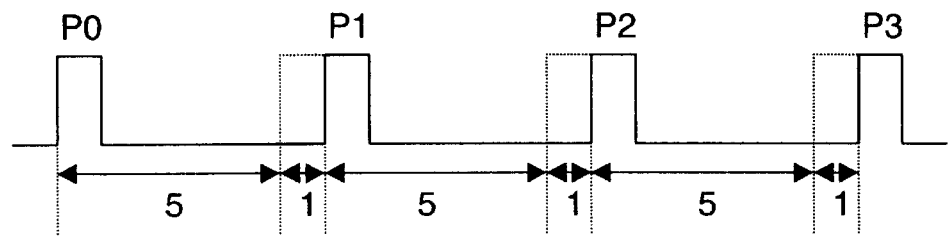

FIG. 4B shows the signal waveform obtained when the output signal D1 of the delay circuits #2 108 is selected as the output pulse signal DOUT. In this case, the initial pulse P0 of the reference pulse signal fed to the delay circuit 102 is given first a delay of 5 unit times by the five flip-flop circuits constituting the delay circuits #1 107 and then a delay of 1 unit time by the first-stage flip-flop circuit of the delay circuits #2 108. Thus, in the output pulse signal DOUT appears a pulse P1 given a delay of (5+1) unit times relative to the initial pulse P0.

This pulse P1 is fed back to the reference pulse generator 101, and is fed again as the reference pulse signal to the delay circuit 102. Thereafter, in a similar manner, the pulse fed to the delay circuit 102 is given a delay of (5+1) unit times so that pulses P2 and P3 are produced sequentially. Thus, the pulse period of the output pulse signal DOUT equals 6 unit times. Here, since the pulse width of each pulse in the output pulse signal DOUT equals 1 unit time, the duty factor of the output pulse signal DOUT equals ⅙.

Figure 4C:
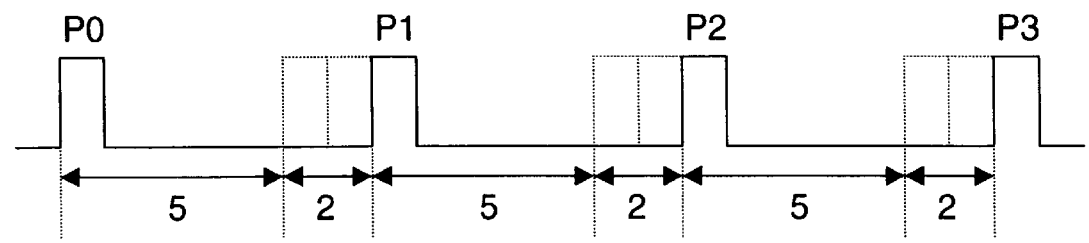

FIG. 4C shows the signal waveform obtained when the output signal D2 of the delay circuits #2 108 is selected as the output pulse signal DOUT. In this case, the pulse period of the output pulse signal DOUT equals 7 unit times, and therefore the duty factor of the output pulse signal DOUT equals ⅐. In a similar manner, when the output signal D3, D4, or D5 of the delay circuits #2 108 is selected as the output pulse signal DOUT, the duty factor of the output pulse signal DOUT equals ⅛, ⅑, or ⅒ respectively.

Figure 4D:
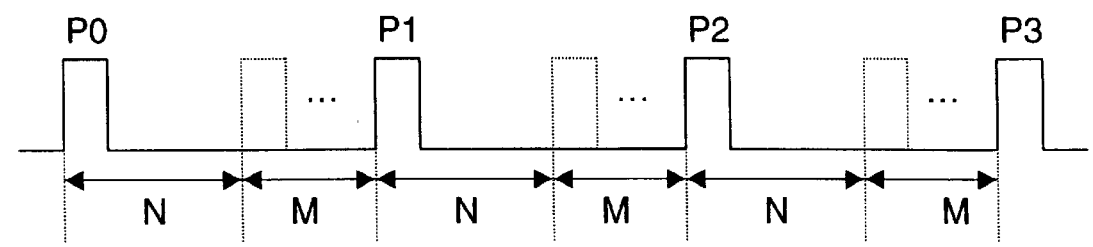

As a more generalized example, FIG. 4D shows the signal waveform obtained when the delay circuits #1 107 have N delay stages and the output signal of the M-th delay stage of the delay circuits #2 108 is selected as the output pulse signal DOUT. In this case, the pulse period of the output pulse signal DOUT equals (N+M) unit times, and therefore the duty factor of the output pulse signal DOUT equals 1/(N+M).

Here, if it is assumed that the first and second control signals φ1 and φ2 produced by the switch timing controller 104 are pulse signals obtained basically as the logical NOT (inversion) of the output pulse signal DOUT, the magnitude of the output voltage VINT fed out of the voltage conversion circuit is given by $$VINT = \frac{1}{N+M} \times VDD \quad (2)$$

According to formula (2) above, if it is assumed that the external source voltage VDD supplied to the voltage conversion circuit of this embodiment equals 3 V, the output voltage VINT obtained when the output signal D0 of the delay circuits #1 107 is selected as the output pulse signal DOUT is calculated as 0.6 V. In a similar manner, the output voltage VINT obtained when one of the output signals D1 to D5 of the delay circuits #2 108 is selected is calculated as 0.5 V, 0.43 V, 0.38 V, 0.33 V, or 0.3 V respectively in this order. Thus, the range in which the output voltage VINT of the voltage conversion circuit of this embodiment can be varied is from 0.3 V to 0.6 V, with the unit variable width being 60 mV on average.

The upper limit of the variable range of the output voltage VINT can be set by controlling the delay produced by the delay circuits #1 107 (i.e. the minimum delay produced by the delay circuit 102). The lower limit of the variable range of the output voltage VINT can be set by controlling the delay produced by the last delay stage of the delay circuits #2 108 (i.e. the maximum delay produced by the delay circuit 102). The unit variable width of the output voltage VINT can be set by controlling the unit delay time of the individual flip-flop circuits constituting the delay circuits #2 108.

As described above, in the voltage conversion circuit of this embodiment adopting the variable pulse period method, it is possible to control the output voltage VINT without the use of a control circuit, such as a counter circuit, that operates at high speed as in a conventional voltage conversion circuit adopting the variable pulse width method. Thus, it is possible to reduce the circuit scale and the operating frequency of the voltage conversion circuit and thereby greatly reduce the power consumption of the voltage conversion circuit itself. This contributes to the reduction of the power consumption of the integrated circuit as a whole.

Moreover, in the voltage conversion circuit of this embodiment, the output voltage VINT is varied in discrete steps within the range in which it can be varied. This circuit configuration helps reduce the number of different control states in the control circuits (i.e., in this embodiment, the delay time controller 103, the selector 109, etc.) of the voltage conversion circuit, i.e. the number of selectable output voltage values. This contributes to the reduction of the circuit scale of such control circuits and thus to the reduction of power consumption.

The circuit configuration of the voltage conversion circuit of this embodiment described above assumes, as an example, a case in which the output voltage VINT for an internal circuit that operates on 0.5 V is produced from the external source voltage VDD of 3 V.

As described earlier, the devices constituting the internal circuit have their respective optimum operating voltages (i.e., in this case, 0.5 V), and therefore, even to cope with variations inevitable in their manufacturing process and changes in the operating environment, there is no need to output a voltage so high as to be close to the external source voltage VDD (i.e. close to 3V) to the internal circuit that operates on 0.5 V. Thus, from the viewpoint of reducing the scale of the control circuits constituting the voltage conversion circuit, it is preferable to make the upper limit of the variable range of the output voltage VINT as low as possible.

For example, when the upper limit of the variable range of the output voltage VINT is set at ½ of the external source voltage VDD or lower, the number of different control states in the control circuits (i.e., in this embodiment, the delay time controller 103, the selector 109, etc.) of the voltage conversion circuit is reduced to half the number required conventionally or less. In this way, by making the upper limit of the variable range of the output voltage VINT as low as possible, it is possible to reduce the circuit scale of the control circuits and thereby reduce power consumption.

In the internal circuit that operates on 0.5 V, if the supply voltage fed to it becomes 0.4 V or lower, its operation speed greatly deteriorates; on the other hand, if the supply voltage becomes 0.6 or higher, its operation speed is saturated. This shows that it is advisable to restrict the variable range of the output voltage VINT supplied to the internal circuit to about ±20% of the optimum operating voltage (i.e. the center value of the variable range of the output voltage VINT) even with consideration given to variations inevitable in the manufacturing process and changes in the operating environment.

In the example described above, the variable range of the output voltage VINT is 0.2 V, which is less than 7% of the external source voltage VDD. By making the variable range of the output voltage VINT as narrow as possible in this way, it is possible to reduce the circuit scale of the control circuits and thereby reduce power consumption.

Moreover, making the upper limit of the variable range of the output voltage VINT as low as possible, or making the variable range as narrow as possible, not only contributes to the reduction of the power consumption of the voltage conversion circuit itself, but also has the effect of reducing variations (ripples) in the output voltage VINT, which problem is a disadvantage of the variable pulse period method.

In general, variations occurring in the output voltage VINT is called ripples. Here, however, for convenience' sake, the peak-to-peak value of voltage variations occurring in the output voltage VINT is called the ripple voltage $\Delta V$. Where an LC filter circuit is used as a smoothing means, the ripple voltage $\Delta V$ is given by $$\Delta V = \frac{(1-D) \cdot T^2}{8 \cdot L \cdot C} \times VINT \quad (3)$$

In formula (3) above, D represents the duty factor of the pulsating voltage signal fed to the LC filter circuit, and T represents the pulse period. Moreover, L represents the inductance and C represents the capacitance of the LC filter circuit.

Formula (3) shows that the magnitude of the ripple voltage $\Delta V$ is proportional to the square of the pulse period T of the pulsating voltage signal fed to the LC filter circuit. In a voltage conversion circuit adopting the variable pulse width method, the pulse period T is constant, and therefore the ripple voltage $\Delta V$ occurring in the output voltage VINT depends only on the duty factor D. On the other hand, in a voltage conversion circuit adopting the variable pulse period method, the pulse period T is variable, and therefore the ripple voltage $\Delta V$ occurring in the output voltage VINT depends on both the duty factor D and the pulse period T.

As described above, the ripple voltage $\Delta V$ is proportional to the square of the pulse period T, and therefore, as the pulse period T becomes longer, the ripple voltage $\Delta V$ tends to increase abruptly. The problem here is that, in the variable pulse period method, it is necessary to make the pulse period T longer to make the output voltage VINT lower, and therefore attempting to lower the output voltage VINT results in increasing the ripple voltage $\Delta V$.

Moreover, in a voltage conversion circuit adopting the variable pulse period method, unnecessarily widening the variable range of the output voltage VINT results in a great difference between the pulse period obtained with the output voltage VINT at the upper limit of its variable range and the pulse period obtained with the output voltage VINT at the lower limit of its variable range. This increases variations in the ripple voltage $\Delta V$ that occur when the output voltage VINT is varied, and thus makes it impossible to control the output voltage VINT accurately.

By contrast, in the voltage conversion circuit of this embodiment, the upper limit of the variable range of the output voltage VINT is made as low as possible to make the variable range as narrow as possible, and in addition the variable pulse period method is adopted. This circuit configuration makes it possible to minimize the difference between the pulse period obtained with the output voltage VINT at the upper limit of its variable range and the pulse period obtained with the output voltage VINT at the lower limit of its variable range, and thereby reduce variations in the ripple voltage $\Delta V$ to practically negligible levels. Moreover, this circuit configuration makes it possible to shift the entire variable range of the pulse period T toward the shorter-period side, and thereby minimize the ripple voltage $\Delta V$ that appears when an attempt is made to lower the output voltage VINT.

Next, the voltage conversion circuit of a second embodiment of the invention will be described. The voltage conversion circuit of this embodiment has basically the same circuit configuration as the voltage conversion circuit of the first embodiment (see FIG. 1). In this embodiment, however, an improvement is made in the delay circuit 102 provided in the output pulse generator 100. Therefore, in the following description of this embodiment, emphasis is placed on the delay circuit 202, which characterizes it.

Figure 5:
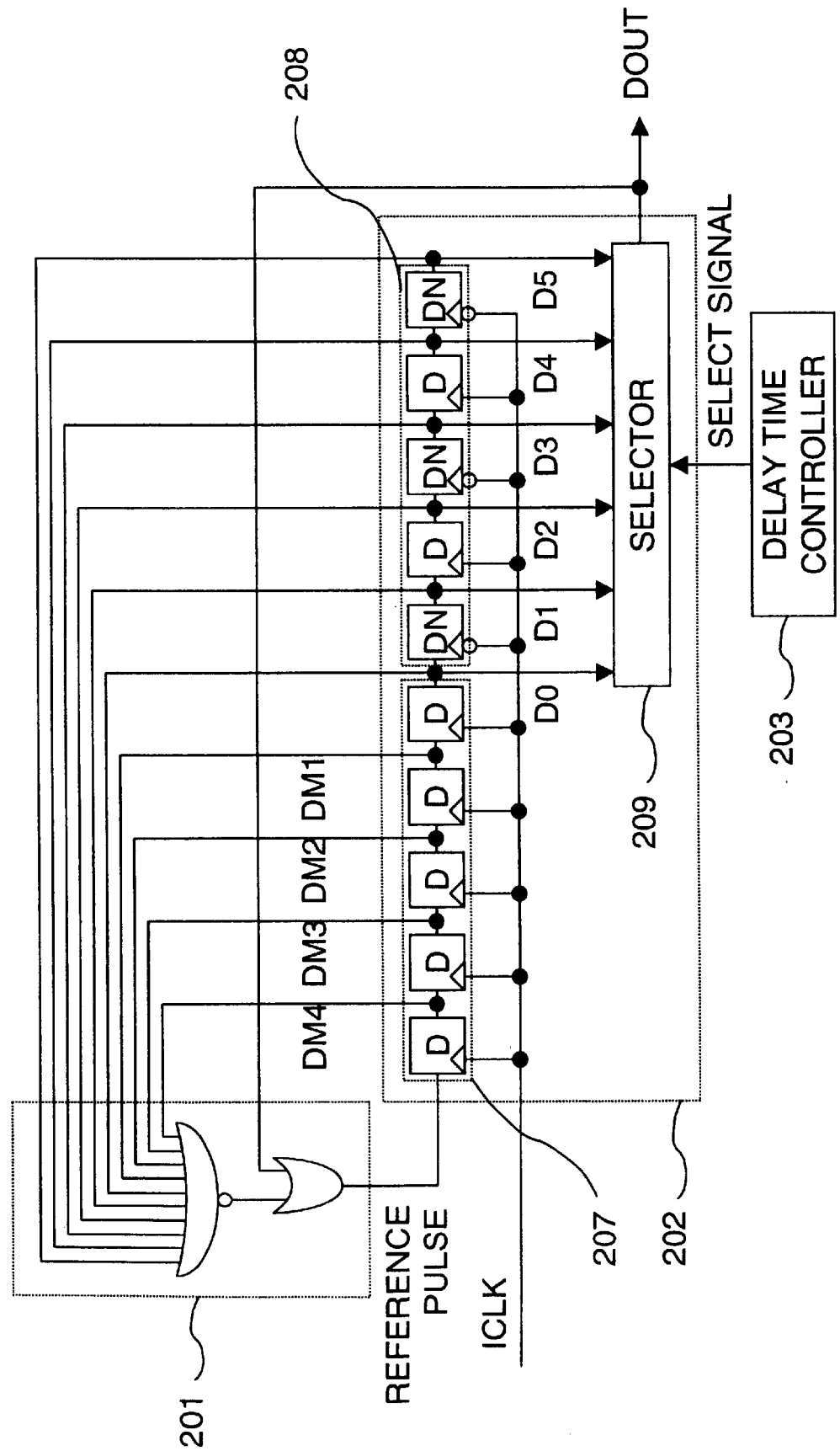
FIG. 5 is a diagram schematically showing an example of the circuit configuration of the reference pulse generator 201 and the delay circuits 202 in a second embodiment of the invention.

FIG. 5 is a diagram schematically showing an example of the circuit configuration of the reference pulse generator 201 and the delay circuit 202 in the second embodiment. The reference pulse generator 201 is a circuit that generates a reference pulse signal having a fixed pulse width and that feeds it to the delay circuit 202.

The delay circuit 202 is a circuit that produces a delayed pulse signal delayed by a predetermined time relative to the reference pulse signal, and is composed of delay circuits #1 (or fixed delay circuits) 207, delay circuits #2 (or multi-delay circuits) 208, and a selector 209. The delayed pulse signal is fed as the output pulse signal DOUT to the switch timing controller (not shown) provided in the following stage and also to the reference pulse generator 201. The delay time controller 203 is a circuit that feeds a select signal to the selector 209 and thereby sets the delay produced by the delay circuit 202 so that the desired output voltage VINT is obtained.

In this embodiment, the reference pulse generator 201 and the selector 209 are configured in the same manner and operate in the same manner as the reference pulse generator 101 (see FIG. 2) and the selector 109 (see FIG. 3) in the first embodiment, and therefore their explanations will not be repeated. The circuit configuration and the operation of the delay time controller 203 will be described in detail later.

In the delay circuit 202, the delay circuits #1 207 are built as a shift register (of which the number of delay stages is N=5) composed of five D flip-flop circuits, which are triggered by positive (rising) edges of an internal clock signal ICLK, connected in series. Thus, these flip-flop circuits output, at their respective output terminals, output signals DM4 to DM1 and D0 that are respectively given delays of 1 to 5 times a predetermined unit time relative to the reference pulse signal. Here, the number N of delay stages needs to be 1 or more.

On the other hand, the delay circuits #2 208 are built as a shift register (of which the number of delay stages is M=5) composed of three DN flip-flop circuits, which are triggered by negative (trailing) edges of the internal clock signal ICLK, and two D flip-flop circuits, which are triggered by positive edges of the internal clock signal ICLK, connected alternately in series. That is, each flip-flop circuit receives a clock whose phase is 180° out of phase relative to the clock fed to the flip-flop circuit in the preceding stage. Here, the number M of delay stages needs to be 1 or more.

Thus, these flip-flop circuits output, at their respective output terminals, output signals D1 to D5 that are each given a delay corresponding to half a period of the internal clock signal ICLK (i.e. 0.5 times the predetermined unit time) relative to the output signal output from the preceding stage. In other words, the output signals D1 to D5 are signals that are respectively given delays of 0.5 to 2.5 times the predetermined unit time relative to the output signal D0 of the delay circuits #1 207.

The flip-flop circuits constituting the delay circuit 202 all receive, at their clock terminals, the same internal clock signal ICLK. As this internal clock signal ICLK may be used a clock signal produced by any means, for example an external clock signal fed from outside the integrated circuit, a clock signal obtained through frequency division of such an external clock signal, or a clock signal generated by an oscillation circuit provided within the integrated circuit.

Instead of the DN flip-flop circuits that are triggered by negative edges of the internal clock signal ICLK, D flip-flop circuits that are driven by a clock having an inverted phase may be used to achieve the same effect as described above.

With the delay circuit 202 configured as described above, when one of the output signals D0 to D5 is selected as the output pulse signal DOUT, the duty factor equals ⅕, ⅕.₅, ⅙, ⅙.₅, ⅐, or ⅐.₅ respectively. As a more generalized example, in a case where the delay circuits #1 207 have N delay stages and the output signal of the M-th delay stage of the delay circuits #2 208 is selected as the output pulse signal DOUT, the duty factor equals 1/(N+0.5×M).

According to formula (2) noted earlier, if it is assumed that the external source voltage VDD supplied to the voltage conversion circuit of this embodiment equals 3 V, the output voltage VINT obtained when the output signal D0 of the delay circuits #1 207 is selected as the output pulse signal DOUT is calculated as 0.6 V. In a similar manner, the output voltage VINT obtained when one of the output signals D1 to D5 of the delay circuits #2 208 is selected is calculated as 0.55 V, 0.5 V, 0.46 V, 0.43 V, or 0.4 V respectively in this order. Thus, the range in which the output voltage VINT of the voltage conversion circuit of this embodiment can be varied is from 0.4 V to 0.6 V, with the unit variable width being 40 mV on average.

As described above, in the voltage conversion circuit of this embodiment, the differences among the delays given respectively to the output signals D0 to D5 output from the delay circuits #2 208 are made smaller, and thereby the unit variable width of the output voltage VINT is made smaller than in the first embodiment. This makes it possible to enhance the accuracy with which the output voltage VINT is varied.

Needless to say, adopting the voltage conversion circuit of this embodiment helps reduce circuit scale and power consumption as compared with conventional circuit configurations, and these advantages are comparable to those offered by the voltage conversion circuit of the first embodiment.

Figure 6:
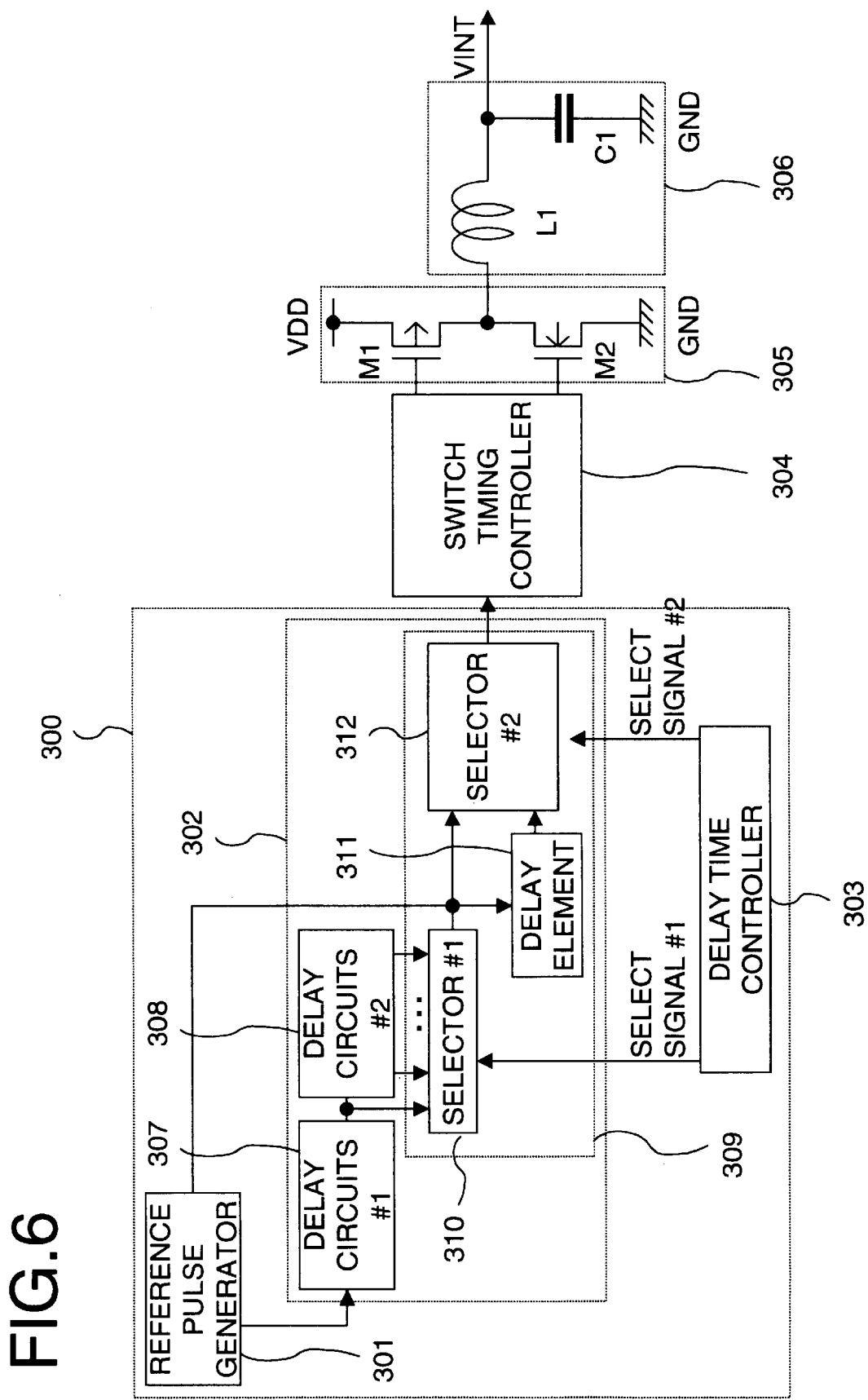
FIG. 6 is a diagram schematically showing the circuit configuration of the voltage conversion circuit of a third embodiment of the invention.

Next, the voltage conversion circuit of a third embodiment of the invention will be described. FIG. 6 is a diagram schematically showing the circuit configuration of the voltage conversion circuit of the third embodiment. As this figure shows, the voltage conversion circuit of this embodiment has basically the same circuit configuration as the voltage conversion circuit of the first embodiment (see FIG. 1). In this embodiment, however, an improvement is made in the output pulse generator 100. Therefore, in the following description of this embodiment, emphasis is placed on the output pulse generator 300, which characterizes it.

The output pulse generator 300 is a circuit that generates an output pulse signal DOUT having a fixed pulse width and a variable pulse period and that feeds it to the switch timing controller 304. In this embodiment, the output pulse generator 300 is composed of a reference pulse generator 301, a delay circuit 302, and a delay time controller 303.

The reference pulse generator 301 is a circuit that generates a reference pulse signal having a fixed pulse width and that feeds it to the delay circuit 302. The delay circuit 302 is a circuit that produces a delayed pulse signal delayed by a predetermined time relative to the reference pulse signal, and is composed of delay circuits #1 (or fixed delay circuits) 307, delay circuits #2 (or multi-delay circuits) 308, and a selector 309. In this embodiment, the selector 309 includes a selector #1 310, a delay element 311, and a selector #2 312.

The delay time controller 303 is a circuit that feeds select signals #1 and #2 to the selector 309 and thereby sets the delay produced by the delay circuit 302 so that the desired output voltage VINT is obtained. The circuit configuration and the operation of the delay time controller 303 will be described in detail later.

Figure 7:
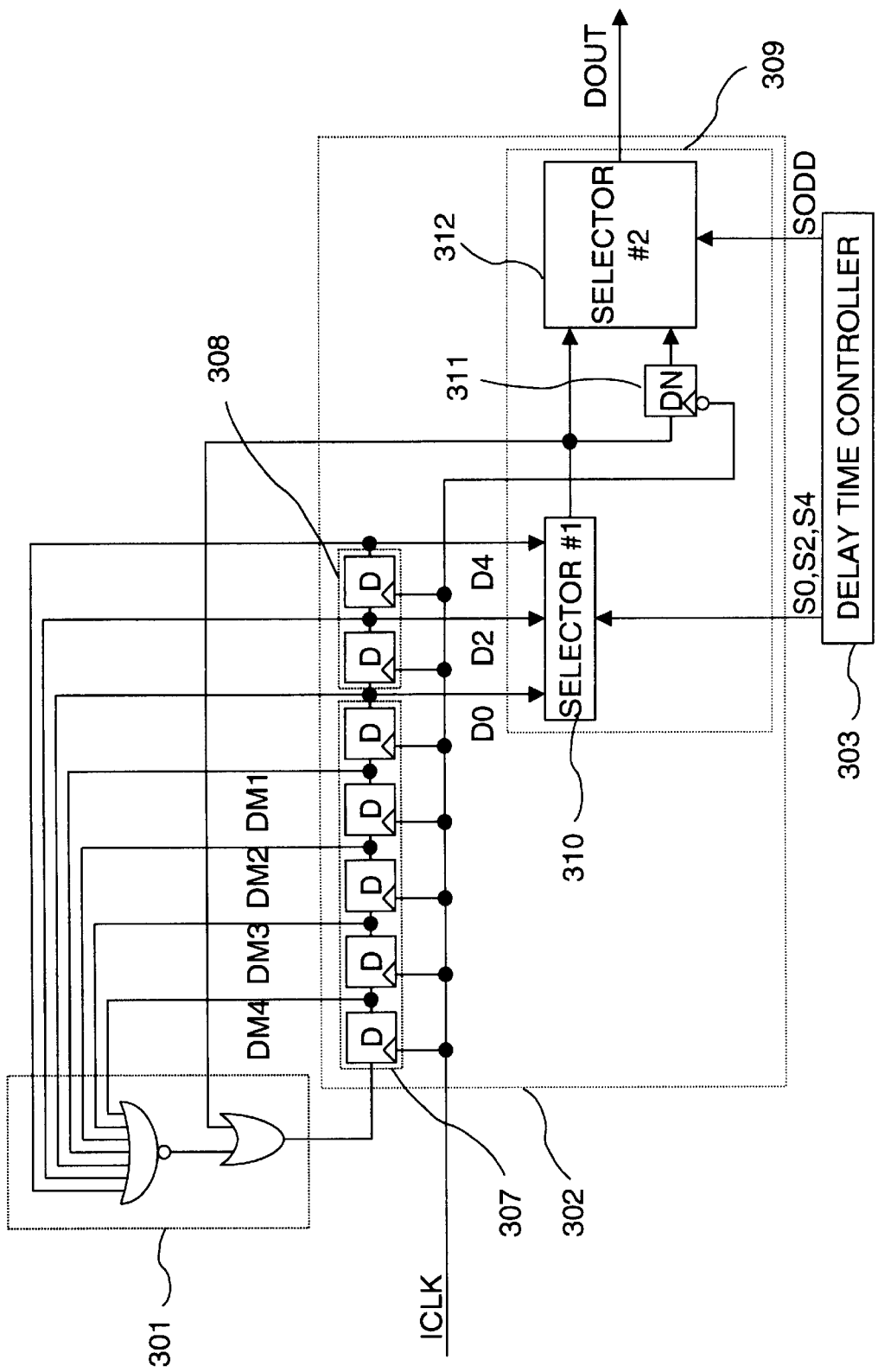
FIG. 7 is a diagram schematically showing an example of the circuit configuration of the reference pulse generator 301 and the delay circuits 302.

FIG. 7 is a diagram schematically showing an example of the circuit configuration of the reference pulse generator 301 and the delay circuit 302. As this figure shows, the reference pulse generator 301 is composed of a NOR circuit having multiple input terminals, and an OR circuit having two input terminals. This reference pulse generator 301 is configured in the same manner and operates in the same manner as in the first embodiment described earlier. Therefore, in the following description, the explanations of the reference pulse generator 301 will not be repeated, and instead emphasis is placed on the delay circuit 302.

In the delay circuit 302, the delay circuits #1 307 as a whole act as a circuit that gives a delay of N times a predetermined unit time to the reference pulse signal fed from the reference pulse generator 301. The delay circuits #2 308 as a whole act as a circuit that gives a delay of M times the predetermined unit time to the final output signal D0 of the delay circuits #1 307.

FIG. 7 shows an example in which the delay circuits #1 307 and the delay circuits #2 308 employ, as unit time delay elements, D flip-flop circuits that are triggered by positive edges of an internal clock signal ICLK, and the following description assumes this circuit configuration. However, as the unit time delay elements may be used flip-flop circuits or delay elements of any other configuration other than D flip-flop circuits.

The delay circuits #1 307 are built as a shift register (of which the number of delay stages is N=5) composed of five D flip-flop circuits connected in series. Thus, these flip-flop circuits output, at their respective output terminals, output signals DM4 to DM1 and D0 that are respectively given delays of 1 to 5 times a predetermined unit time relative to the reference pulse signal. Here, the number N of delay stages needs to be 1 or more.

The delay circuits #2 308 are built as a shift register (of which the number of delay stages is M=2) composed of two D flip-flop circuits connected in series. Thus, these flip-flop circuits output, at their respective output terminals, output signals D2 and D4 that are respectively given delays of 1 and 2 times the predetermined unit time relative to the output signal D0. That is, the output signals D2 and D4 in this embodiment are the same pulse signals as the output signals D2 and D4 in the second embodiment described earlier. Here, the number M of delay stages needs to be 1 or more.

In this way, the delay circuit 302 can be formed easily by building the delay circuits #1 307 and the delay circuits #2 308 with flip-flop circuits.

Next, the selector 309 of this embodiment will be described. As described earlier, the selector 309 includes the selector #1 310, the delay element 311, and the selector #2 312. The selector #1 310 is a circuit that selects as the delayed pulse signal one among the final output signal D0 of the delay circuits #1 307 and the output signals D2 and D4 of the delay circuits #2 308 according to the select signals #1 S0, S2, and S4 fed from the delay time controller 303. The delayed pulse signal selected by the selector #1 310 is fed to the delay element 311, to the selector #2 312, and to the reference pulse generator 301.

The delay element 311 is a circuit that gives a further delay of a predetermined time to the delayed pulse signal selected by the selector #1 310. The delay produced by the delay element 311 may be set by a control signal fed externally, or may be set internally beforehand.

In the voltage conversion circuit of this embodiment, as the delay element 311 is used a DN flip-flop circuit that is triggered by negative edges of the internal clock signal ICLK. Thus, in response to the output signal D0, D2, or D4 selected by the selector #1 310, the delay element 311 outputs an output signal D1, D3, or D5 respectively that is given a further delay corresponding to half a period of the internal clock signal ICLK (i.e. 0.5 times the predetermined unit time). That is, the output signals D1, D3, and D5 output from the delay element 311 are the same pulse signals as the output signals D1, D3, and D5 in the second embodiment.

The flip-flop circuits constituting the delay circuit 302 and the delay element 311 all receive, at their clock terminals, the same internal clock signal ICLK. As this internal clock signal ICLK may be used a clock signal produced by any means, for example an external clock signal fed from outside the integrated circuit, a clock signal obtained through frequency division of such an external clock signal, or a clock signal generated by an oscillation circuit provided within the integrated circuit. As the delay element 311 may be used a flip-flop circuit or a delay element of any other type than a DN flip-flop circuit.

The selector #2 312 is a circuit that selects as the output pulse signal DOUT one of the output signal of the selector #1 310 and the output signal of the delay element 311 according to the select signal #2 SODD fed from the delay time controller 303 and that feeds the output pulse signal DOUT to the switch timing controller 304 provided in the next stage.

Figure 8:
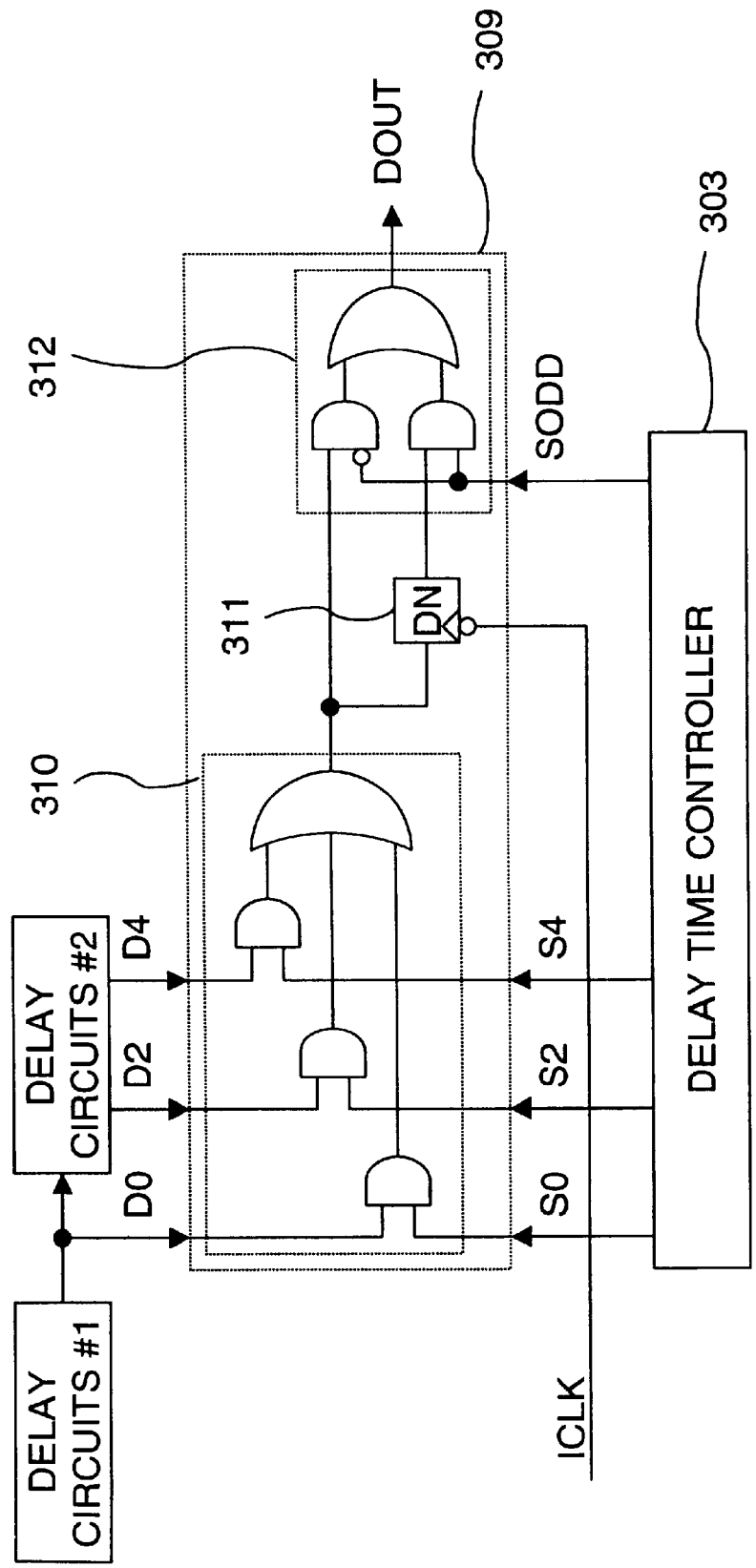
FIG. 8 is a diagram schematically showing an example of the circuit configuration of the selector 309.

FIG. 8 is a diagram schematically showing an example of the circuit configuration of the selector 309. As this figure shows, the selector #1 310 is composed of three AND circuits each having two input terminals, and an OR circuit having multiple input terminals. On the other hand, the selector #2 312 is composed of two AND circuits each having two input terminals, and an OR circuit having two input terminals.

First, the circuit configuration of the selector #1 310 will be described. The AND circuits respectively receive, at one input terminal, the final output signal D0 of the delay circuits #1 307 and the output signals D2 and D4 of the delay circuits #2 308. Moreover, the AND circuits respectively receive, at the other input terminal, the select signals #1 S0, S2, and S4 fed from the delay time controller 303. The select signals #1 S0, S2, and S4 are so controlled as not to change in periods in which a pulse signal is flowing through the delay circuits #2 308. On the other hand, the OR circuit receives, at its input terminals, the output signals of the individual AND circuits, and outputs the logical sum (OR) of those signals as the delayed pulse signal selected by the selector #1 310.

Next, the circuit configuration of the selector #2 312 will be described. The AND circuits respectively receive, at one input terminal, the output signal of the selector #1 310 and the output signal of the delay element 311. Moreover, the AND circuits both receive, at the other input terminal, the select signal #2 SODD fed from the delay time controller 303. Here, to the other input terminal of the AND circuit to which the output signal of the selector #1 310 is fed, the select signal #2 SODD is fed after being inverted. Moreover, the select signal #2 SODD is so controlled as not to change in periods in which a pulse signal is flowing through the delay circuits #2 308. On the other hand, the OR circuit receives, at its input terminals, the output signals of the individual AND circuits, and outputs the logical sum (OR) of those signals as the output pulse signal DOUT selected by the selector #2 312.

For example, to select the output signal D0 as the output pulse signal DOUT, the selector #1 310 is made to select the output signal D0, and the selector #2 312 is made to select the output signal fed directly from the selector #1 310. To achieve this, the select signal #1 S0 is turned to H level, the other select signals #1 S2 and S4 are kept at L level, and the select signal #2 SODD is turned to L level.

To select the output signal D1, which is delayed by half a period of the internal clock signal ICLK (i.e. 0.5 times the predetermined unit time) relative to the output signal D0, as the output pulse signal DOUT, the selector #1 310 is made to select the output signal D0, and the selector #2 312 is made to select the output signal fed from the delay element 311. To achieve this, the select signal #1 S0 is turned to H level, the other select signals #1 S2 and S4 are kept at L level, and the select signal #2 SODD is turned to H level.

As described above, the voltage conversion circuit of this embodiment permits its output voltage VINT to be varied with accuracy comparable to or higher than the accuracy achieved by the voltage conversion circuit of the second embodiment. Moreover, the voltage conversion circuit of this embodiment permits the number of flip-flop circuits constituting the delay circuits #2 to be reduced to fewer than in the second embodiment described earlier.

If one compares the second and third embodiments described above, as compared with the delay circuits #2 208 (see FIG. 5) in the second embodiment, the delay circuits #2 308 (see FIG. 7) have two less flip-flop circuits. In this way, this embodiment makes it possible to reduce the circuit scale and the power consumption of the delay circuit 302 without degrading the accuracy with which the output voltage VINT is varied. Moreover, reducing the number of flip-flop circuits constituting the delay circuits #2 308 results in reducing the number of input terminals of the NOR circuit provided in the reference pulse generator 301. This also contributes to the reduction of circuit scale.

Needless to say, adopting the voltage conversion circuit of this embodiment helps reduce circuit scale and power consumption as compared with conventional circuit configurations, and these advantages are comparable to those offered by the voltage conversion circuits of the first and second embodiments.

Figure 9:
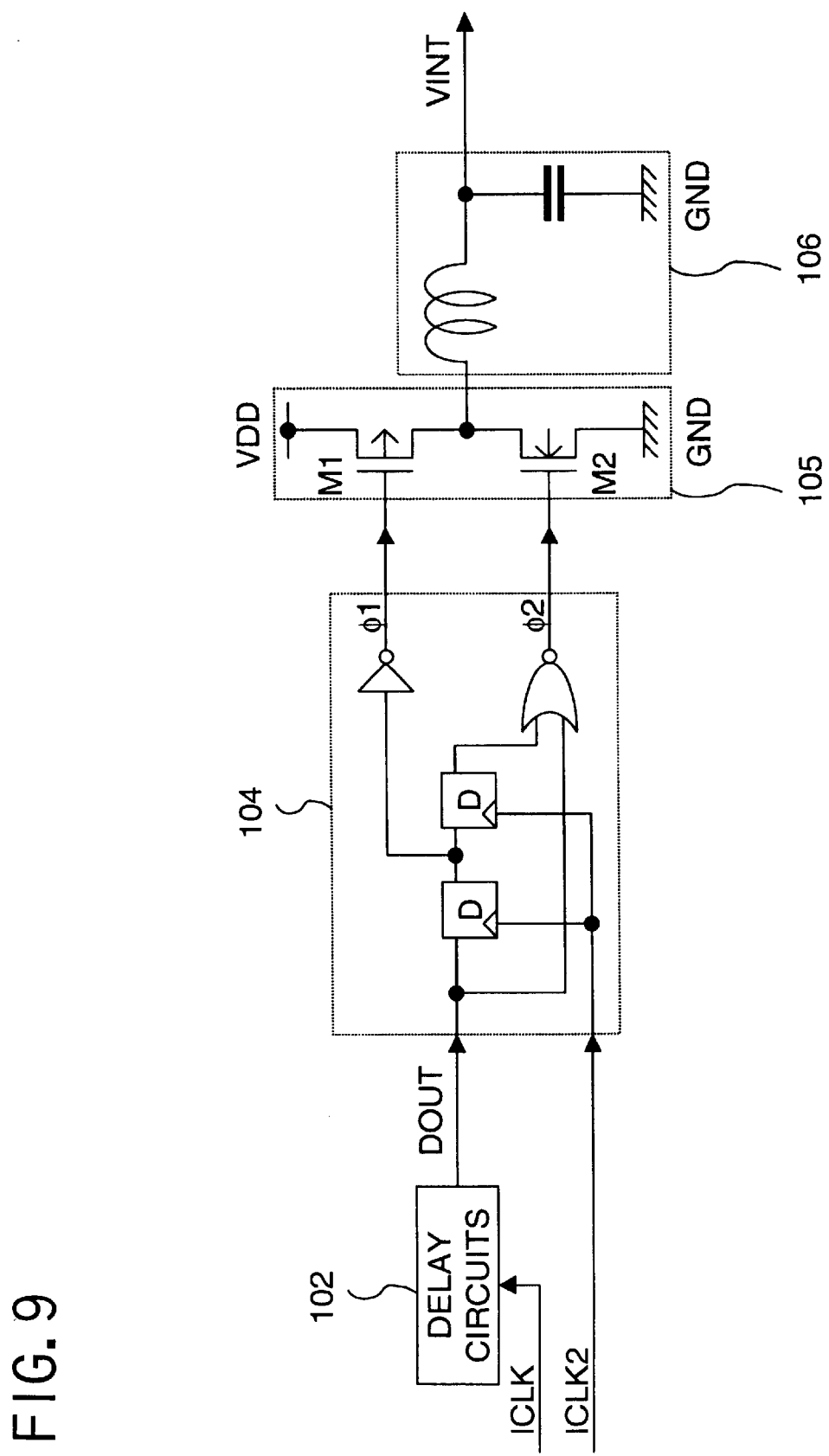
FIG. 9 is a diagram schematically showing an example of the circuit configuration of the switch timing controller 104.

Next, the circuit configuration and the operation of the switch timing controllers 104, 204, and 304 provided in the voltage conversion circuits of the embodiments described thus far will be described. The switch timing controllers 104, 204, and 304 have basically the same circuit configuration, and therefore, in the following description, the switch timing controller 104 of the first embodiment is taken up as an example. FIG. 9 is a diagram schematically showing an example of the circuit configuration of the switch timing controller 104. As this figure shows, the switch timing controller 104 includes a first and a second D flip-flop circuit, an inverter circuit, and a NOR circuit having two input terminals.

The output end of the delay circuit 102 is connected to the data input terminal of the first D flip-flop circuit and to one input terminal of the NOR circuit. The output terminal of the first D flip-flop circuit is connected to the data input terminal of the second D flip-flop circuit and to the input terminal of the inverter circuit. The output terminal of the second D flip-flop circuit is connected to the other input terminal of the NOR circuit. The output terminal of the inverter circuit is connected to the gate of the PMOS transistor M1 provided in the switch circuit 105, and the output terminal of the NOR circuit is connected to the gate of the NMOS transistor M2 provided in the switch circuit 105.

The first and second D flip-flop circuits both receive, at their clock terminals, an internal clock signal ICLK2. The internal clock signal ICLK2 is a double-speed version of the internal clock signal ICLK mentioned earlier with which the delay circuit 102 is driven, and has twice the frequency of the internal clock signal ICLK.

In the switch timing controller 104 configured as described above, the output pulse signal DOUT, which is synchronous with the internal clock signal ICLK, is given a delay corresponding to one period of the internal clock signal ICLK2 by the first D flip-flop circuit, of which the output signal is then logically inverted by the inverter circuit to produce a first control signal φ1. The output signal of the first D flip-flop circuit is given a further delay corresponding to one period of the internal clock signal ICLK2 by the second D flip-flop circuit, of which the output signal is then fed, together with the output pulse signal DOUT fed directly from the delay circuit 102, to the NOR circuit. The NOR circuit, by outputting the inverted logical sum (NOR) of these signals, produces a second control signal φ2.

Figure 10A:
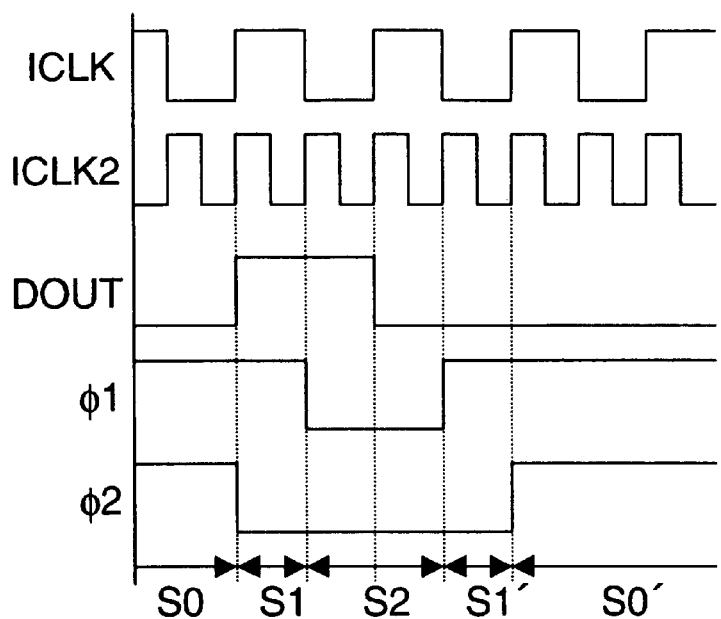
FIGS. 10A and 10B are timing charts showing the signal waveforms observed in the switch timing controller 104.
Figure 10B:
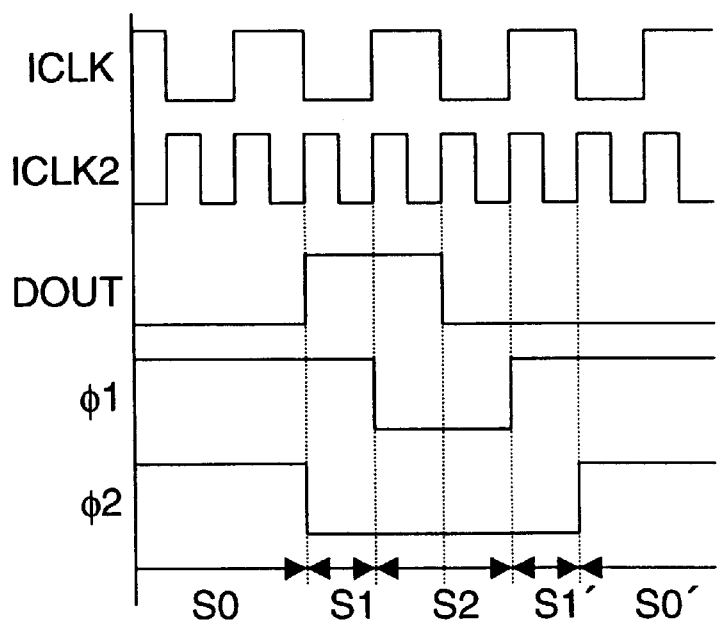

FIGS. 10A and 10B are timing charts of relevant signal waveforms observed in the switch timing controller 104. FIG. 10A shows a case in which the output pulse signal DOUT is synchronous with a positive edge of the internal clock signal ICLK. FIG. 10B shows a case in which the output pulse signal DOUT is synchronous with a negative edge of the internal clock signal ICLK.

As these figures show, in the switch timing controller 104 configured as described above, the timing with which the first control signal φ1 is turned to L level (i.e. the timing with which the PMOS transistor M1 is turned on) is intentionally delayed relative to the timing with which the second control signal φ2 is turned to L level (i.e. the timing with which the NMOS transistor M2 is turned off). Moreover, the timing with which the second control signal φ2 is turned to H level (i.e. the timing with which the NMOS transistor M2 is turned on) is intentionally delayed relative to the timing with which the first control signal φ1 is turned to H level (i.e. the timing with which the PMOS transistor M1 is turned off).

More specifically, the PMOS transistor M1 is kept on only during a period S2, and is kept off otherwise. On the other hand, the NMOS transistor M2 is kept on only during periods S0 and S0', and is kept off otherwise. That is, in periods S1 and S1', both the PMOS transistor M1 and the NMOS transistor M2 are off, and thus there is no period in which the PMOS transistor M1 and the NMOS transistor M2 are simultaneously on.

In this way, by controlling the on/off states of the PMOS transistor M1 and the NMOS transistor M2 in such a way that first one MOS transistor is turned off and then, a predetermined time thereafter, the other MOS transistor is turned on, it is possible to eliminate the possibility that the PMOS transistor M1 and the NMOS transistor M2 are on simultaneously even if a slight unintentional delay occurs in one of the first and second control signals φ1 and φ2 while they are being produced. This makes it possible to prevent a through current from flowing through the switch circuit 105 and thereby save unnecessary power consumption.

In a case where the first and second D flip-flop circuits, which give a delay to the output pulse signal DOUT, are driven by the internal clock signal ICLK2, which is a double-speed version of the internal clock signal ICLK, i.e. in a case where the output pulse signal DOUT is synchronous with either a positive or negative edge of the internal clock signal ICLK, the delay produced by the first and second D flip-flop circuits is made equal to half a period of the internal clock signal ICLK, i.e. equal to the period of the internal clock signal ICLK2.

In the embodiment described above, as an example of elements for giving a delay to the output pulse signal DOUT, D flip-flop circuits are used. However, as those elements may be used flip-flop circuits or delay elements of any other type other than D flip-flop circuits.

Figure 11:
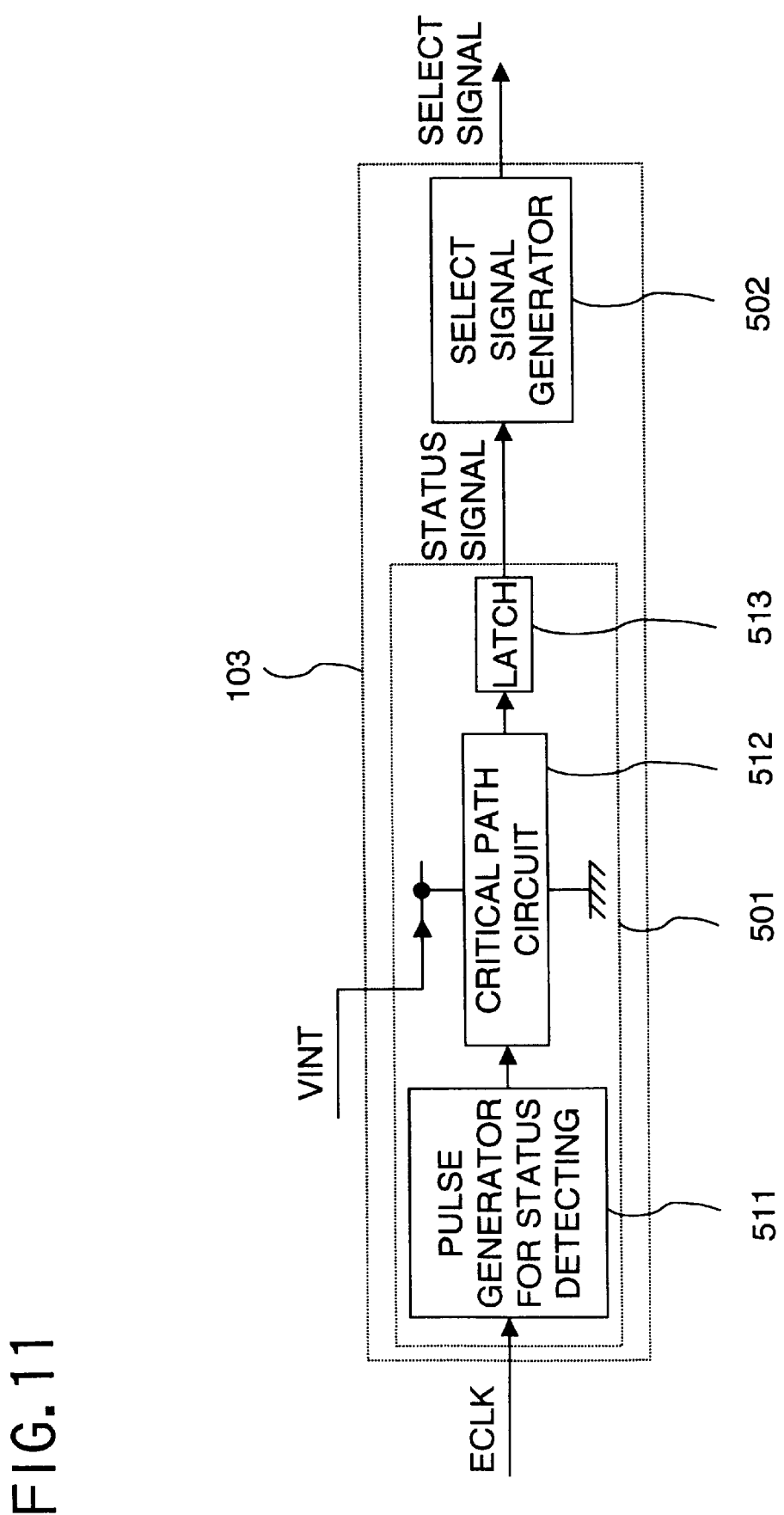
FIG. 11 is a diagram schematically showing an example of the circuit configuration of the delay time controller 103.

Next, the circuit configuration and the operation of the delay time controllers 103, 203, and 303 provided in the voltage conversion circuits of the embodiments described thus far will be described. The delay time controllers 103, 203, and 303 have basically the same circuit configuration, and therefore, in the following description, the delay time controller 103 of the first embodiment is taken up as an example. FIG. 11 is a diagram schematically showing an example of the circuit configuration of the delay time controller 103.

As described earlier, the delay time controller 103 is a circuit that feeds a select signal to the selector 109 provided in the delay circuit 102 and thereby sets the delay produced by the delay circuit 102 so that the desired output voltage VINT is obtained. As FIG. 11 shows, the delay time controller 103 includes a replica circuit 501 and a select signal generator 502.

First, the replica circuit 501 will be described. The replica circuit 501 is a circuit that generates a status signal that indicates the operation status of the internal circuit that operates on the output voltage VINT. The replica circuit 501 is composed of a pulse generator 511 for status detecting (hereinafter the "status-detecting pulse generator"), a critical path circuit 512, and a first and a second latch 513A and 513B (collectively referred to as the "latch 513").

The status-detecting pulse generator 511 is a circuit that generates a pulse signal from the operation clock signal ECLK of the internal circuit that operates on the output voltage VINT. The pulse signal thus generated is fed to the critical path circuit 512 provided in the following stage.

The critical path circuit 512 is a circuit that produces a delay equivalent to the delay across the critical path through the internal circuit, i.e. the path that is considered to produce the longest delay to a signal fed thereto. To cope with variations inevitable in the manufacturing process and changes in the operating environment, the critical path circuit 512 is produced by the same manufacturing process as the internal circuit. Moreover, the output voltage VINT of the filter circuit 106 is applied as the supply voltage to the critical path circuit 512. That is, the driving voltage of the internal circuit, which is the destination of the voltage supply, is monitored by the critical path circuit 512.

The latch 513 is a circuit that temporarily holds the pulse signal output from the critical path circuit 512, and its output signal is fed, as the status signal of the replica circuit 501, to the select signal generator 502 provided in the following stage.

Figure 12:
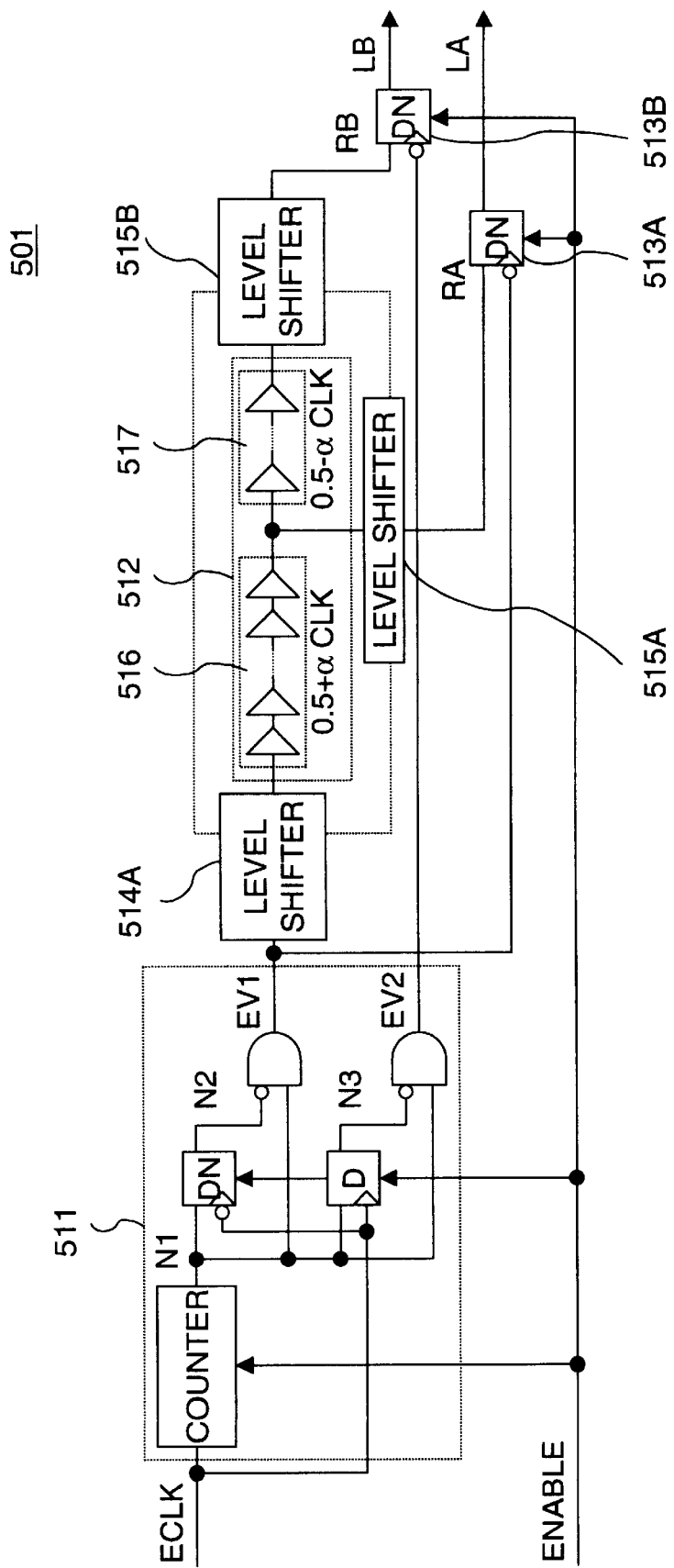
FIG. 12 is a diagram schematically showing an example of the circuit configuration of the replica circuit 501.

Next, a practical example of the circuit configuration of the replica circuit 501 and its operation will be described. FIG. 12 is a diagram schematically showing an example of the circuit configuration of the replica circuit 501. First, the circuit configuration and the operation of the status-detecting pulse generator 511 will be described. As FIG. 12 shows, the status-detecting pulse generator 511 includes a counter, a first and a second flip-flop circuits, and a first and a second AND circuit each having two input terminals.

The counter is a circuit that performs frequency division on the operation clock signal ECLK of the internal circuit and thereby produces an output signal N1. The output terminal of the counter is connected to the data input terminals of the first and second flip-flop circuits, and also to one input terminal of each of the first and second AND circuits.

The first flip-flop circuit is a DN flip-flop circuit that is triggered by negative edges of the operation clock signal ECLK, and its output signal N2 is a signal delayed by half a period of the operation clock signal ECLK relative to the output signal N1 of the counter. The output signal N2 is logically inverted and is then fed to the other input terminal of the first AND circuit.

The second flip-flop circuit is a D flip-flop circuit that is triggered by positive edges of the operation clock signal ECLK, and its output signal N3 is a signal delayed by one period of the operation clock signal ECLK relative to the output signal N1 of the counter. The output signal N3 is logically inverted and is then fed to the other input terminal of the first AND circuit.

The first AND circuit is a circuit that generates a pulse signal EV1 by giving the logical product (AND) of the logical NOT (inversion) of the output signal N2 and the output signal N1. The second AND circuit is a circuit that generates a pulse signal EV2 by giving the logical product (AND) of the logical NOT (inversion) of the output signal N3 and the output signal N1.

The counter and the first and second flip-flop circuits mentioned above all operate when an enable signal ENABLE fed from outside the replica circuit 501 is on (at H level).

Figure 13:
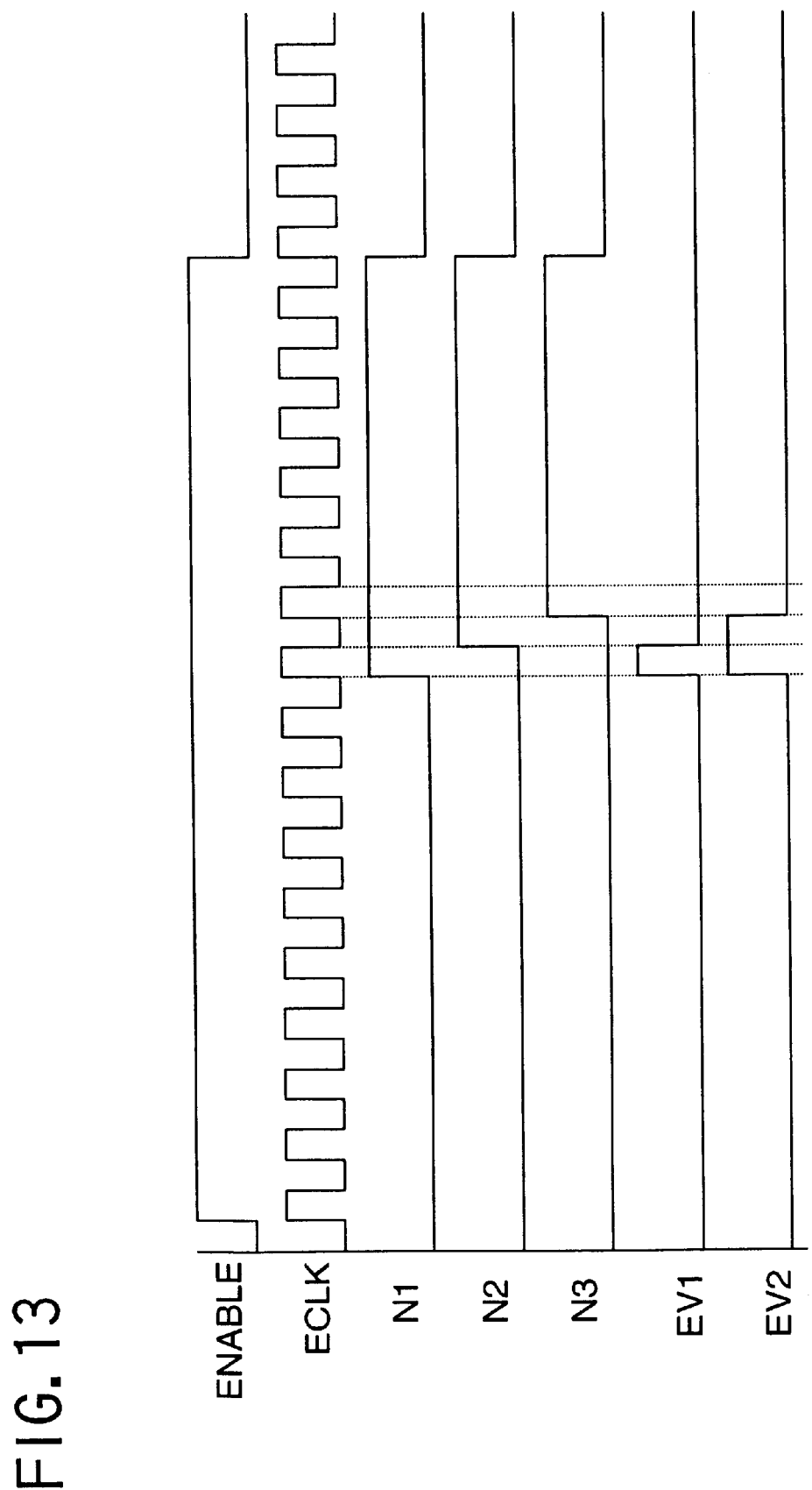
FIG. 13 is a timing chart showing the signal waveforms observed in the pulse generator for status detecting 511.

Now, the operation of the status-detecting pulse generator 511 configured as described above will be described. FIG. 13 is a timing chart of relevant signal waveforms observed in the status-detecting pulse generator 511. The following description deals with a case in which the enable signal ENABLE is kept on (at H level) for a period corresponding to 16 periods of the operation clock signal ECLK of the internal circuit.

As the output signal N1 shown in FIG. 13 indicates, here, the division factor of the counter is set at ⅛. This specific division factor makes it possible to limit the number of pulse signals EV1 and EV2 generated while the enable signal ENABLE is on to one each and thereby suppress unnecessary operation of the replica circuit 501.

Moreover, as described earlier, the output signal N2 of the first flip-flop circuit is a signal delayed by half a period of the operation clock signal ECLK relative to the output signal N1, and the output signal N3 of the second flip-flop circuit is a signal delayed by one period of the operation clock signal ECLK relative to the output signal N1. Thus, the pulse width of the pulse signal EV1 generated by the first AND circuit corresponds to half a period of the operation clock signal ECLK, and the pulse width of the pulse signal EV2 generated by the second AND circuit corresponds to one period of the operation clock signal ECLK.

Next, back in FIG. 12, the circuit configuration of the critical path circuit 512 will be described. As described earlier, the critical path circuit 512 is a circuit driven by the output voltage VINT output from the filter circuit 106, and therefore the H level of the signals input to and output from it equals the output voltage VINT. Thus, to adapt the voltage levels used in the critical path circuit 512 to those used in the status-detecting pulse generator 511 and the first and second latches 513A and 513B and vice versa, the critical path circuit 512 is provided with a step-down level shifter 514A in its input stage and step-up level sifters 515A and 515B in its output stage.

The replica circuit 501 shown in FIG. 12 operates by monitoring whether the critical path circuit 512 provided within itself can output a pulse signal within a predetermined period (within one period of the operation clock signal ECLK by which the internal circuit is driven) or not and recognizing, on the basis of the result of that monitoring, the operation status of the internal circuit as one of the following states: an overspeed state (hereinafter "operation state FAST"), an operative state (hereinafter "operation state OK"), an unsafe state (hereinafter "operation state WARN"), and an inoperative state (hereinafter "operation state NG").

To discriminate the four operation states mentioned above, the critical path circuit 512 is divided into a front critical path circuit 516 and a latter critical path circuit 517. Here, if it is assumed that the critical path circuit 512 as a whole produces a delay of 1, the front critical path circuit 516 and the latter critical path circuit 517 produce delays of 0.5+α and 0.5−α respectively. That is, the critical path circuit 512 is so divided that the front critical path circuit 516 produces a longer delay than the latter critical path circuit 517.

A suitable example of the circuit configuration of the critical path circuit 512 is an inverter chain composed of a plurality of inverter circuits connected in series. However, instead of inverter circuits, NAND circuit or NOR circuits may be used.

The pulse signal EV1 output from the status-detecting pulse generator 511 is fed through the step-down level shifter 514A to the front critical path circuit 516. The output signal of the front critical path circuit 516 is fed to the latter critical path circuit 517, and is fed also to the step-up level sifter 515A so as to be formed into an output signal RA, which is fed to the first latch 513A. The output signal of the latter critical path circuit 517 is fed to the step-up level sifter 515B so as to be formed into an output signal RB, which is fed to the second latch 513B.

The first latch 513A is a DN flip-flop circuit that is triggered by a negative edge of the pulse signal EV1 output from the status-detecting pulse generator 511, and receives, at its data input terminal, the output signal RA from the step-up level sifter 515A. The second latch 513B is a DN flip-flop circuit that is triggered by a negative edge of the pulse signal EV2, and receives, at its data input terminal, the output signal RB from the step-up level sifter 515B.

Thus, the signal LA obtained by latching the output signal RA in the first latch 513A on a negative edge of the pulse signal EV1 and the signal LB obtained by latching the output signal RB in the second latch 513B on a negative edge of the pulse signal EV2 are used as status signals LA and LB that are eventually fed from the replica circuit 501 to the select signal generator 502 provided in the following stage.

The replica circuit 501 simply needs to detect the operation status immediately before the output pulse signal DOUT is selected in the delay circuit 102, and therefore the first and second latches 513A and 513B both need to be operated only while the enable signal ENABLE fed from outside the replica circuit 501 is on.

Figure 14:
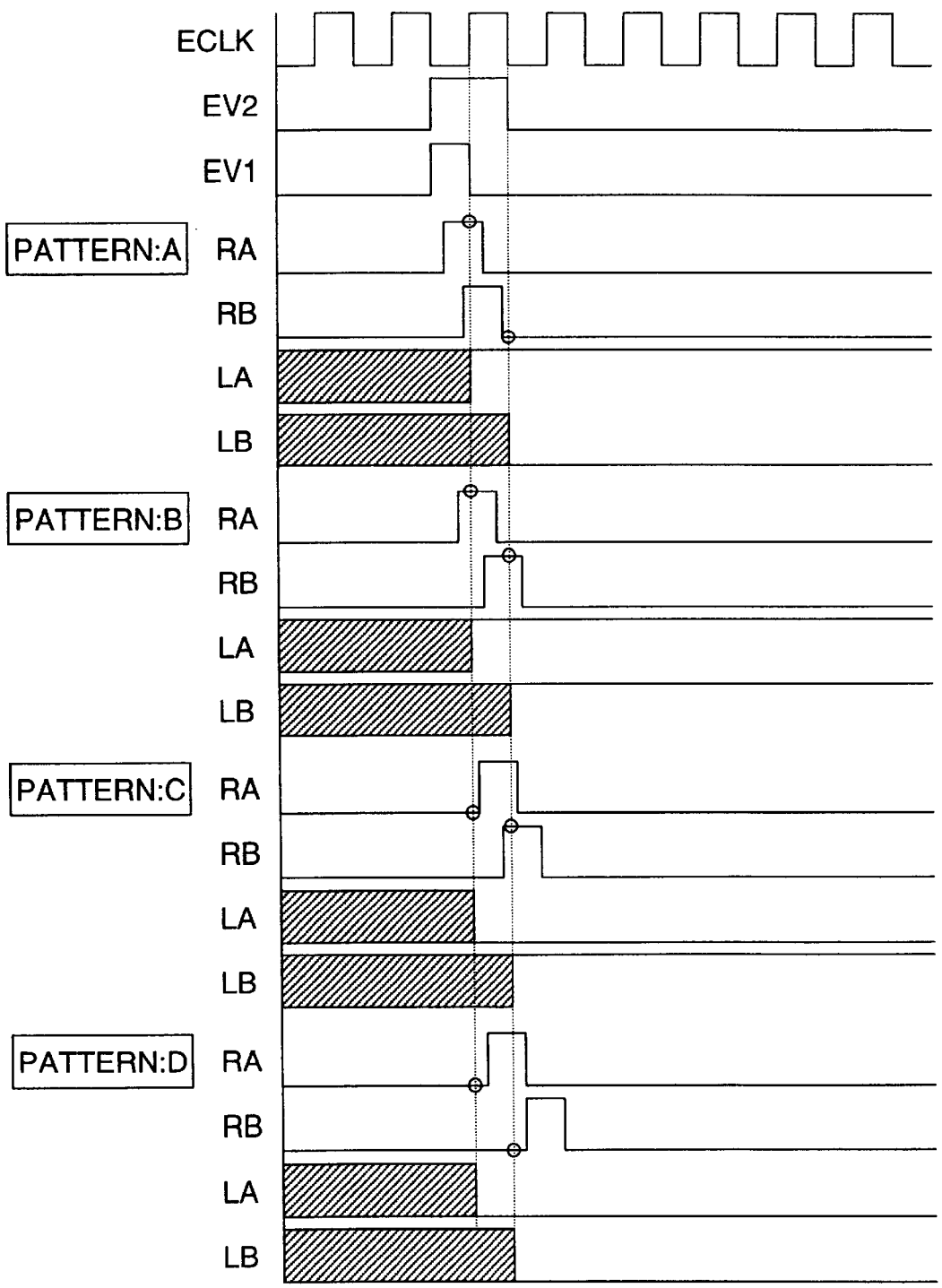
FIG. 14 is a timing chart showing the signal waveforms observed in the replica circuit 501.

Now, the operation of the replica circuit 501 configured as described above will be described. FIG. 14 is a timing chart of relevant signal waveforms observed in the replica circuit 501. In the following description, the pulse width of the pulse signal EV1 (half a period of the operation clock signal ECLK) is referred to as the "first predetermined operation time," the pulse width of the pulse signal EV2 (one period of the operation clock signal ECLK) is referred to as the "second predetermined operation time," the delay produced by the front critical path circuit 516 is referred to as the "first operation time," and the delay produced by the critical path circuit 512 as a whole is referred to as the "second operation time."

In FIG. 14, Pattern A shows a case in which the output signal RA is latched at H level in the first latch 513A and the output signal RB is latched at L level in the second latch 513B, i.e. a case in which the second operation time is shorter than the first predetermined operation time. In this case, the critical path circuit 512 as a whole is operating with a delay shorter than half a period of the operation clock signal ECLK. Thus, the internal circuit driven by the output voltage VINT is considered to be operating at sufficiently high speed. Accordingly, when the status signals LA and LB of the replica circuit 501 are at H and L levels respectively, the operation status is recognized as "operation state FAST."

In FIG. 14, Pattern B shows a case in which the output signal RA is latched at H level in the first latch 513A and the output signal RB is latched at H level in the second latch 513B, i.e. a case in which the first operation time is shorter than the first predetermined operation time and the second operation time is longer than the first predetermined operation time but shorter than the second predetermined operation time. In this case, the front critical path circuit 516 is operating with a delay shorter than half a period of the operation clock signal ECLK and the critical path circuit 512 as a whole is operating with a delay longer than half a period of the operation clock signal ECLK but shorter than one period thereof. Thus, the internal circuit driven by the output voltage VINT is considered to be operating properly. Accordingly, when the status signals LA and LB of the replica circuit 501 are both at H level, the operation status is recognized as "operation state OK."

In FIG. 14, Pattern C shows a case in which the output signal RA is latched at L level in the first latch 513A and the output signal RB is latched at H level in the second latch 513B, i.e. a case in which the first operation time is longer than the first predetermined operation time and the second operation time is shorter than the second predetermined operation time. In this case, the front critical path circuit 516 is operating with a delay longer than half a period of the operation clock signal ECLK and the critical path circuit 512 as a whole is operating with a delay shorter than one period thereof. Thus, the internal circuit driven by the output voltage VINT is considered to be operating with insufficient operation margins and thus very likely to become inoperative upon a slight change in the operating environment or the like. Accordingly, when the status signals LA and LB of the replica circuit 501 are at L and H levels respectively, the operation status is recognized as "operation state WARN."

In FIG. 14, Pattern D shows a case in which the output signal RA is latched at L level in the first latch 513A and the output signal RB is latched at L level in the second latch 513B, i.e. a case in which the second operation time is longer than the second predetermined operation time. In this case, the critical path circuit 512 as a whole is operating with a delay longer than one period of the operation clock signal ECLK. Thus, the internal circuit driven by the output voltage VINT is considered to be very likely to be inoperative. Accordingly, when the status signals LA and LB of the replica circuit 501 are both at L level, the operation status is recognized as "operation state NG."

Figure 15:
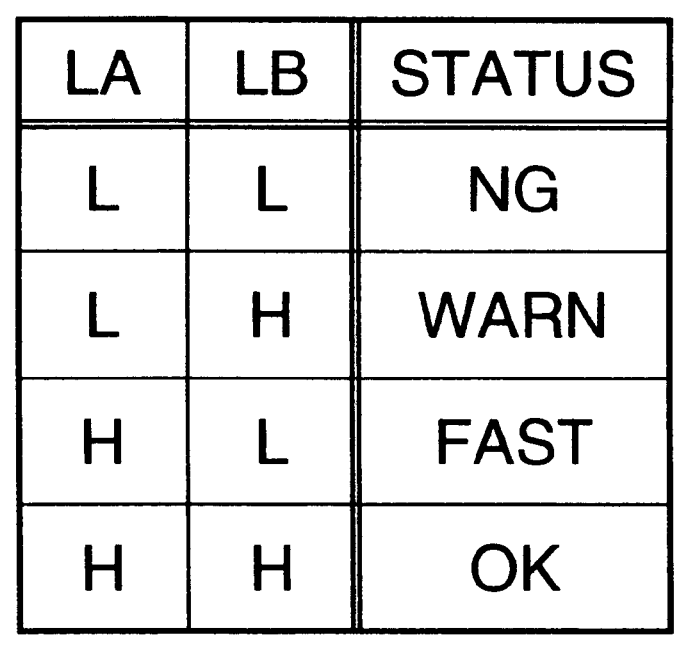

As described above, the four operation states of the replica circuit 501 are discriminated by the combination of the status signals LA and LB. FIG. 15 is a table showing the relationship between the status signals LA and LB and the operation status of the internal circuit. In this way, by classifying the operation status of the critical path circuit 512 into four states (FAST, OK, WARN, and NG), it is possible to recognize with sufficient reliability the operation status of the internal circuit that is driven by the output voltage VINT. This makes it possible to cope with any variations inevitable in the manufacturing process and changes in the operating environment, and thus to supply the optimum output voltage VINT at a given time. This contributes to the reduction of the power consumption of the integrated circuit as a whole.

Next, the circuit configuration and the operation of the select signal generator 502 will be described. The select signal generator 502 is a circuit that generates a select signal with which to select the output pulse signal DOUT output from the delay circuit 102 according to the status signals LA and LB fed from the replica circuit 501.

For example, when the status signals LA and LB indicate "operation state FAST," the select signal generator 502 makes the output voltage VINT one step lower from its current level. That is, the select signal is so generated that the delay produced by the delay circuit 102 is made one step longer from its current value. When the status signals LA and LB indicate "operation state OK," the select signal generator 502 keeps the output voltage VINT at its current level. That is, the select signal is so generated that the aforementioned delay is kept at its current value. When the status signals LA and LB indicate "operation state WARN" or "operation state NG," the select signal generator 502 makes the output voltage VINT one step higher from its current level. That is, the select signal is so generated that the aforementioned delay is made one step shorter from its current value.

In all the embodiments described heretofore, the output voltage VINT is varied by increasing and decreasing the delay produced by the delay circuit 102, but the alternatives among which the delay circuit 102 can select the output pulse signal DOUT are limited to the output signals D0 to D5. Thus, in generating the select signal, exceptions need to be handled appropriately so that, if the output pulse signal DOUT selected previously is the output signal D0 and then the replica circuit 501 requests that the aforementioned delay be made another step shorter, or if the output pulse signal DOUT selected previously is the output signal D5 and then the replica circuit 501 requests that the aforementioned delay be made another step longer, the output voltage VINT is kept at its current level, i.e. the aforementioned delay is kept at its current value.

Figure 16:
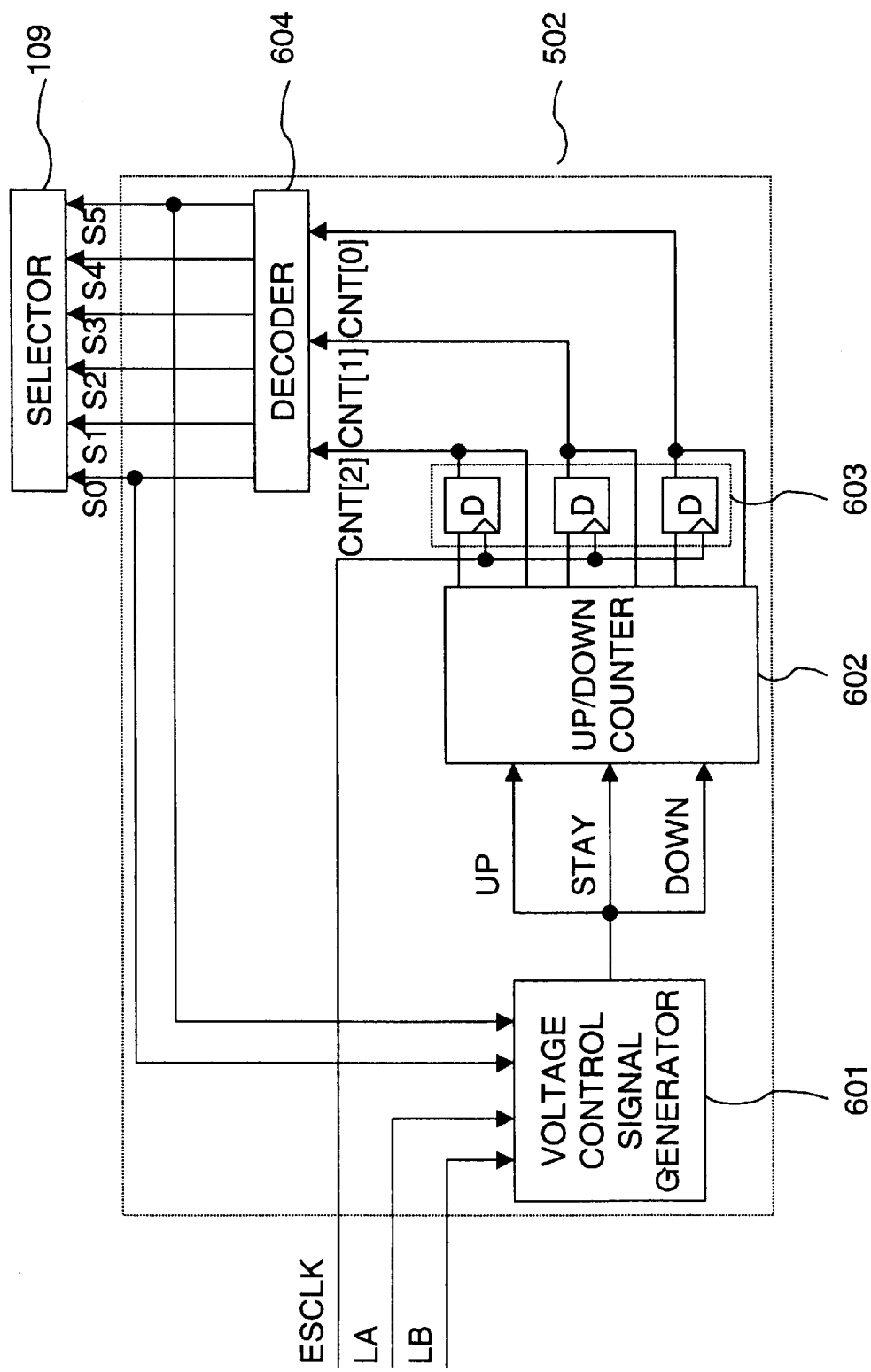
FIG. 16 is a diagram schematically showing an example of the circuit configuration of the select signal generator 502.

FIG. 16 shows a practical example of the circuit configuration of the select signal generator 502, devised with the above considerations in mind. FIG. 16 is a diagram schematically showing an example of the circuit configuration of the select signal generator 502. As this figure shows, the select signal generator 502 includes a voltage control signal generator 601, an up/down counter 602, a register 603, and a decoder 604.

The voltage control signal generator 601 is a circuit that produces voltage control signals UP, STAY, and DOWN according to the status signals LA and LB fed from the replica circuit 501 and the select signals S0 and S5 fed from the decoder 604. FIG. 17 is a truth table of the logic circuit provided in the voltage control signal generator 601. The voltage control signal UP is a signal that requests that the delay produced by the delay circuit 102 be made one step shorter from its current value. The voltage control signal STAY is a signal that requests that the aforementioned delay be kept at its current value. The voltage control signal DOWN is a signal that requests that the aforementioned delay be made one step longer from its current value.

The up/down counter 602 is a circuit that calculates the value indicating the new select signal according to the voltage control signals UP, STAY, and DOWN generated by the voltage control signal generator 601 and the output signals CNT[0] to CNT[2] of the register 603, in which the value indicating the previous select signal is stored. The circuit configuration and the operation of the up/down counter 602 will be described in detail later.

The register 603 is a circuit that temporarily holds the output signals CNT[0] to CNT[2] of the up/down counter 602, and is composed of three D flip-flop circuits that are triggered by a driving clock ESCLK. The driving clock ESCLK for the register 603 is a pulse signal that rises before the delay circuit 102 starts selecting the output pulse signal DOUT.

When the voltage conversion circuit is started up, the D flip-flop circuits constituting the register 603 are first reset to L level by a reset signal (not shown). This causes the select signal S0 output from the decoder 604 to turn to H level and all the other select signals S1 to S5 to turn to L level. That is, as the output pulse signal DOUT at the time of the start-up of the voltage conversion circuit, the output signal D0, which makes the delay produced by the delay circuit 102 shortest, is selected. As a result, the output voltage VINT is set at the upper limit of its variable range, so that the internal circuit to which the output voltage VINT is fed operates reliably even at the time of the start-up of the voltage conversion circuit.

The decoder 604 is a circuit that generates select signals S0 to S5 by decoding the output signals CNT[0] to CNT[2] of the register 603. Specifically, the decoder 604 converts the 3-bit signals (from "000" to "101"), representing from "0" to "5" in the decimal system, held in the register 603 into 6-bit signals (from "100000" to "000001") corresponding respectively to the select signals S0 to S5.

Figures 18, 19:
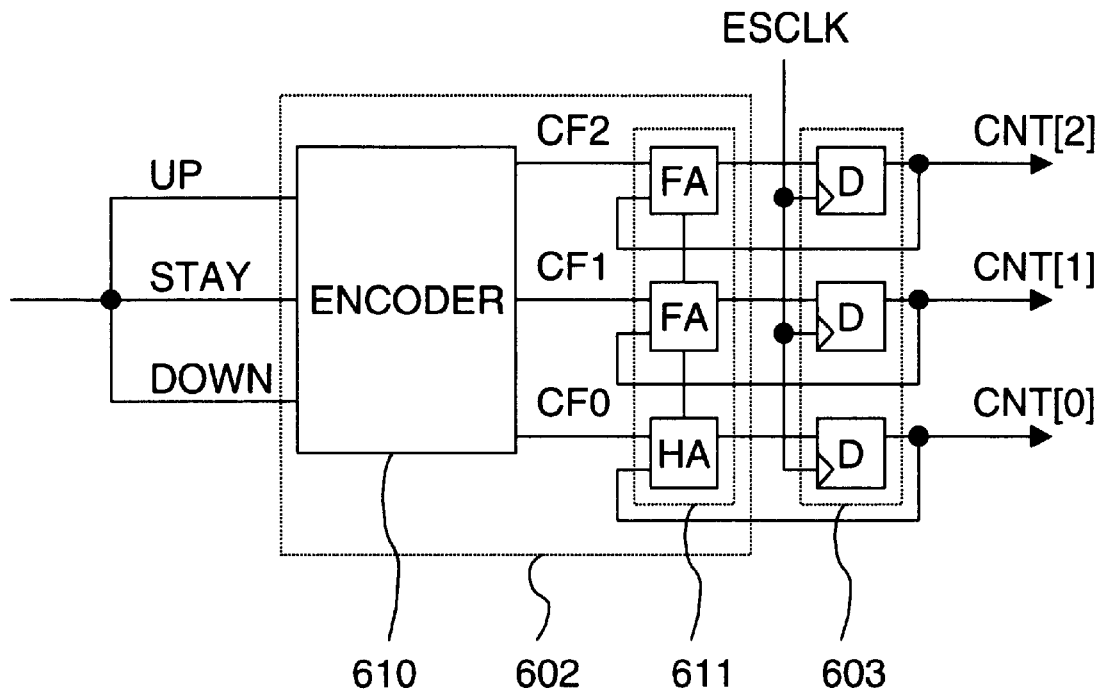
FIG. 18 is a diagram schematically showing an example of the circuit configuration of the up/down counter 602.
FIG. 19 is a truth table of the logic circuit provided in the encoder 610.

Next, the circuit configuration and the operation of the up/down counter 602 will be described. FIG. 18 is a diagram schematically showing an example of the circuit configuration of the up/down counter 602. As this figure shows, the up/down counter 602 includes an encoder 610 and a 3-bit adder 611. The 3-bit adder 611 is composed of two full adders and one half adder.

The encoder 610 is a circuit that generates output signals CF0 to CF2 by encoding the voltage control signals UP, STAY, and DOWN fed from the voltage control signal generator 601. Specifically, the encoder 610 converts the voltage control signals UP, STAY, and DOWN into three-bit signals ("111" to "001") that represent "−1" to "1" in the decimal system. FIG. 19 is a truth table of the logic circuit provided in the encoder 610. The 3-bit adder 611 is a circuit that adds together the output signals CF0 to CF2 of the encoder 610 and the output signals CNT[0] to CNT[2] of the register 603.

It is to be understood that, although the delay time controller 103 provided in the voltage conversion circuit of the first embodiment is taken up as an example in the above description, the delay time controller 103 configured as described above can be used intact as the delay time controller 203 provided in the voltage conversion circuit of the second embodiment.

In a case where the delay time controller 103 configured as described above is used as the delay time controller 303 provided in the voltage conversion circuit of the third embodiment, the decoder 604 is so configured as to generate the first select signals S0, S2, and S4 by decoding the highest two bits of the output signals CNT[0] to CNT[2] of the register 603, and the lowest bit of the output signals CNT[0] to CNT[2] is used as the second select signal SOUT.

Figure 20:
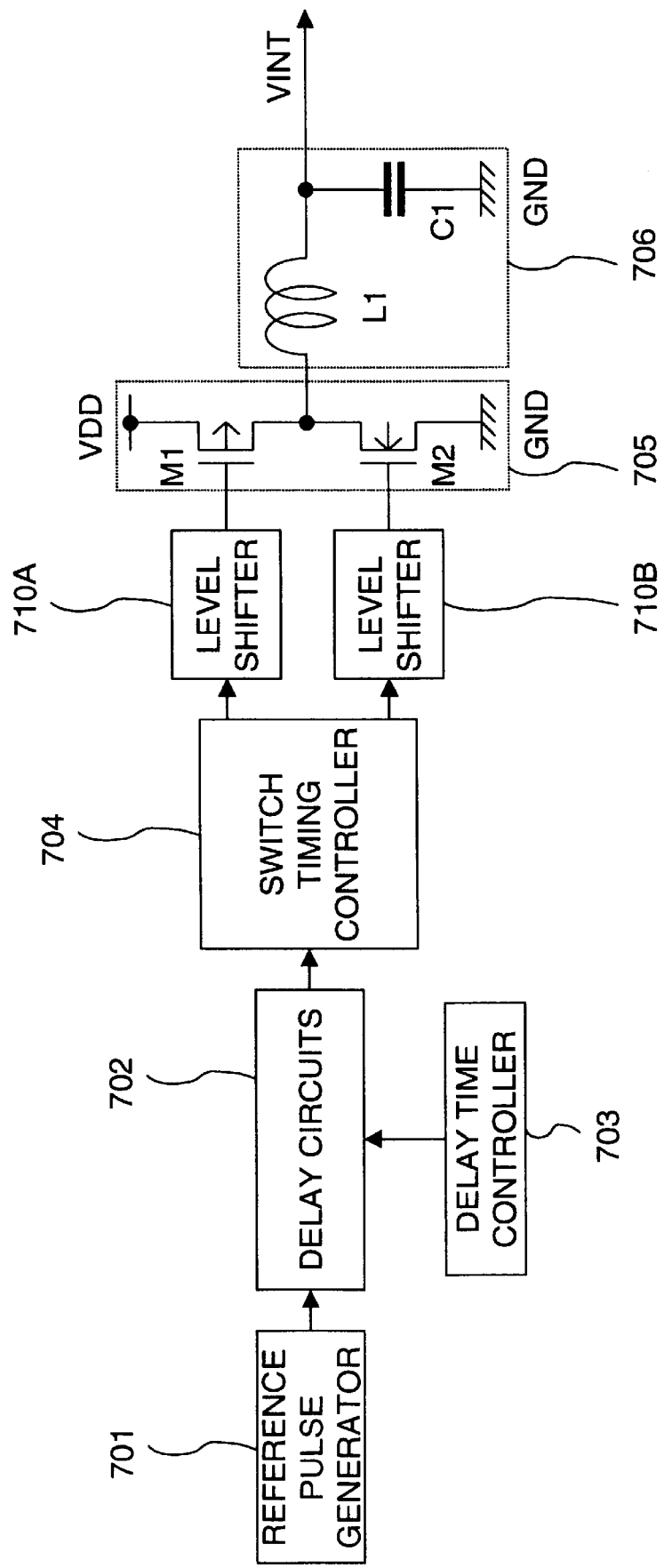
FIG. 20 is a diagram schematically showing the circuit configuration of the voltage conversion circuit of a fourth embodiment of the invention.
Figure 21:
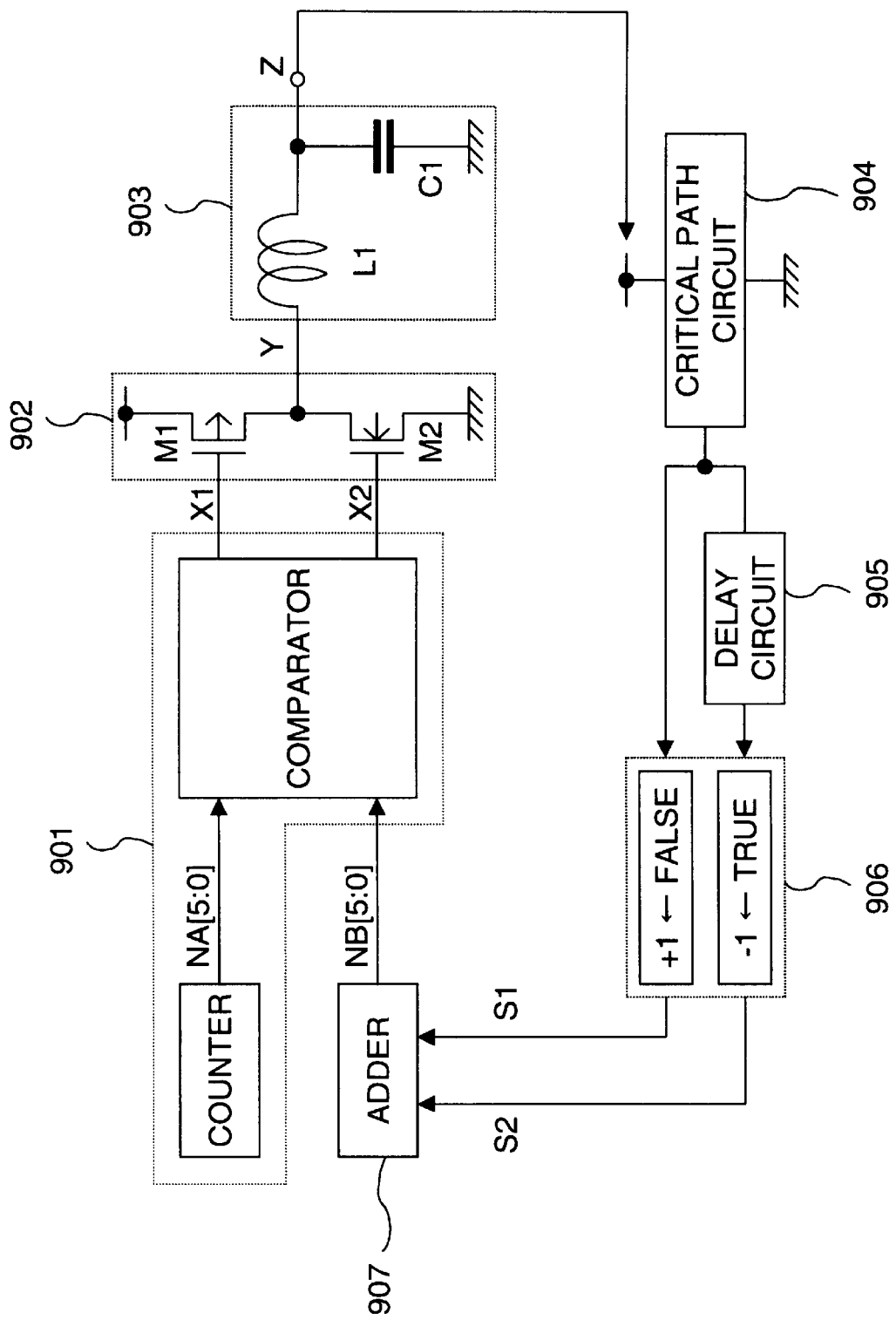
FIG. 21 is a diagram schematically showing an example of the circuit configuration of a conventional voltage conversion circuit.

Next, the voltage conversion circuit of a fourth embodiment of the invention will be described. FIG. 20 is a diagram schematically showing the circuit configuration of the voltage conversion circuit of the fourth embodiment. As this figure shows, the voltage conversion circuit of this embodiment has basically the same circuit configuration as the voltage conversion circuits of the first to third embodiments, but differs from them in that the output voltage VINT is supplied, as a supply voltage, to the output pulse generator (the reference pulse generator, the delay circuit, and the delay time controller) and to the switch timing controller.

As FIG. 20 shows, the voltage conversion circuit of this embodiment includes, in addition to a reference pulse generator 701, a delay circuit 702, a delay time controller 703, a switch timing controller 704, a switch circuit 705, and a filter circuit 706, step-up level shifters 710A and 710B. The reference pulse generator 701, the delay circuit 702, and the delay time controller 703 may be configured in the same manner as in any of the first to third embodiments described earlier.

Here, to the reference pulse generator 701, the delay circuit 702, the delay time controller 703, and the switch timing controller 704 is supplied, as their supply voltage, not the external source voltage VDD but the output voltage VINT of the filter circuit 106.

However, when the switch timing controller 704 is driven by the output voltage VINT output from the filter circuit 706, the H level of the first and second control signals φ1 and φ2 equals the output voltage VINT. This may hinder proper control of the on/off states of the PMOS transistor M1 and the NMOS transistor M2 constituting the switch circuit 705. Therefore, to step up the voltage level of the first and second control signals φ1 and φ2 to the necessary level, the switch timing controller 704 has the step-up level shifters 710A and 710B provided in its output stage.

In this way, by driving all the circuit blocks other than the switch circuit 705 and the filter circuit 706 with the output voltage VINT, which is lower than the external source voltage VDD, it is possible to greatly reduce the power consumption of the voltage conversion circuit itself, and thereby reduce the power consumption of the integrated circuit as a whole.

What is claimed is:

1. A voltage conversion circuit comprising:
    an output pulse generator for generating an output pulse signal having a fixed pulse width at variable pulse periods;
    a switch circuit composed of a PMOS transistor receiving a first supply voltage at a source thereof and an NMOS transistor receiving a second supply voltage at a source thereof, the switch circuit outputting a voltage at a node at which drains of the PMOS and NMOS transistor are connected together;
    a filter circuit for smoothing the voltage output from the switch circuit to produce an output voltage; and
    a switch timing controller for producing from the output pulse signal generated by the output pulse generator, first and second control signals with which to control on/off states of the PMOS and NMOS transistors,
    wherein the output voltage is determined according to a ratio of the pulse width to the pulse period of the output pulse signal.

2. The voltage conversion circuit as claimed in claim 1, wherein the output pulse generator comprises:
    a delay circuit receiving a reference pulse signal having a fixed pulse width and producing therefrom a delayed pulse signal having a predetermined delay relative thereto; and
    a delay time controller for varying the delay produced by the delay circuit,
    wherein the delayed pulse signal is fed as the output signal to the switch timing controller.

3. The voltage conversion circuit as claimed in claim 2, wherein the delay circuit comprises:
    a delay circuit portion composed of a plurality of unit time delay elements connected in series, the unit time delay elements each producing a delay of a unit time; and
    a selector for selecting one among outputs signals output respectively from the unit time delay elements according to a select signal fed from the delay time controller,
    wherein the output signal selected by the selector is used as the delayed pulse signal.

4. The voltage conversion circuit as claimed in claim 3, wherein the delay circuit portion comprises:
    a fixed delay circuit portion composed of one or more flip-flop circuits connected in series; and
    an multi-output circuit portion connected to an output end of the fixed delay circuit portion and composed of one or more flip-flop circuits connected in series,
    wherein the flip-flop circuits constituting the multi-output circuit portion each receive a clock whose phase is 180° out of phase relative to a clock fed to the flip-flop circuit in a preceding stage.

5. The voltage conversion circuit as claimed in claim 3, wherein the selector comprises:
    a first selector portion for selecting one among the output signals respectively output from the unit time delay elements constituting the delay circuit portion according to a first select signal fed from the delay time controller;
    an arbitrary time delay element for giving a predetermined delay to the output signal output from the first selector portion; and
    a second selector portion for choosing between the output signal output from the first selector portion and the output signal from the arbitrary time delay element according to a second select signal fed from the delay time controller,
    wherein the output signal selected by the second selector portion is used as the delayed pulse signal.

6. The voltage conversion circuit as claimed in claim 5, wherein the unit time delay elements constituting the delay circuit portion and the arbitrary time delay element are each a flip-flop circuit, and the arbitrary time delay element receives a clock whose phase is 180° out of phase relative to clocks fed to the unit time delay elements.

7. The voltage conversion circuit as claimed in claim 1, wherein the switch timing controller, when controlling the on/off states of the PMOS and NMOS transistors constituting the switch circuit, controls voltage levels of the first and second control signals in such a way as to turn off one of those transistors first and then, a predetermined time thereafter, turn on the other.

8. The voltage conversion circuit as claimed in claim 3, wherein the delay time controller comprises:
    a replica circuit for detecting operation speed of an internal circuit driven with the output voltage of the voltage conversion circuit in synchronism with a clock signal fed from outside; and
    a select signal generator for generating the select signal according to the operation speed of the internal circuit as detected by the replica circuit,
    wherein the delay produced by the delay circuit is varied in such a way that the output voltage is kept to a minimum required at a given time.

9. The voltage conversion circuit as claimed in claim 8, wherein the replica circuit comprises:
    a critical path circuit, composed of a front delay stage and a latter delay stage connected in series, for producing a delay equal to a delay across a path within the internal circuit that produces a longest delay to an input signal fed thereto,
    wherein the front delay stage produces a delay that lasts for a first operation time and the critical path circuit as a whole produces a delay that lasts for a second operation time, and
    the first and second operation times are each compared with a first predetermined operation time and a second predetermined operation time longer than the first predetermined operation time so that
    if the second operation time is shorter than the first predetermined operation time, it is judged that the operation speed of the internal circuit is too fast, and the select signal generator is instructed to increase the delay produced by the delay circuit, if the first operation time is shorter than the first predetermined operation time and the second operation time is longer than the first predetermined operation time but shorter than the second predetermined operation time, it is judged that the operation speed of the internal circuit is proper, and the select signal generator is instructed to maintain the delay produced by the delay circuit, and if the first operation time is longer than the first predetermined operation time and the second operation time is shorter than the second predetermined operation time, or if the second operation time is longer than the second predetermined operation time, it is judged that the operation speed of the internal circuit is too slow, and the select signal generator is instructed to decrease the delay produced by the delay circuit.

10. The voltage conversion circuit as claimed in claim 1, further comprising:

a step-up level shifter for individually stepping up the first and second control signals output from the switch timing controller and then feeding the stepped-up control signals respectively to gates of the PMOS and NMOS transistors constituting the switch circuit, wherein the output voltage of the filter circuit is fed as a supply voltage to the output pulse generator and the switch timing controller.

* * * * *